United States Patent [19]

Papineau

[11] Patent Number: 4,547,356
[45] Date of Patent: Oct. 15, 1985

[54] METHOD OF GENERATING HYDROGEN AND USING THE GENERATED HYDROGEN

[75] Inventor: Ronald I. Papineau, Goshen, Mass.

[73] Assignee: Unique Energy Systems, Inc., Holyoke, Mass.

[21] Appl. No.: 454,988

[22] Filed: Jan. 3, 1983

Related U.S. Application Data

[60] Division of Ser. No. 175,597, Aug. 5, 1980, Pat. No. 4,371,500, which is a continuation of Ser. No. 921,000, Jun. 30, 1978, abandoned.

[51] Int. Cl.[4] .................. C01G 41/14; H01M 8/18; H01M 8/04; F02B 75/12
[52] U.S. Cl. ..................... 423/658; 429/19; 429/26; 123/1 A; 123/3; 123/DIG. 12
[58] Field of Search ............. 423/648 R, 657–658; 429/19, 20, 26; 123/1 A, 3, DIG. 12

[56] References Cited

U.S. PATENT DOCUMENTS

| | | | |
|---|---|---|---|
| 1,617,965 | 2/1927 | Rochet | 423/658 |
| 3,442,620 | 5/1969 | Huebler et al. | 423/658 |
| 4,332,775 | 6/1982 | Genequand et al. | 423/648 R X |
| 4,342,738 | 8/1982 | Burgund | 423/657 |

FOREIGN PATENT DOCUMENTS

| | | | |
|---|---|---|---|
| 81/00279 | 2/1981 | European Pat. Off. | 423/657 |
| 2098623 | 3/1972 | France | 423/657 |
| 803766 | 10/1958 | United Kingdom | 423/657 |

*Primary Examiner*—Donald R. Valentine
*Attorney, Agent, or Firm*—Hedman, Gibson, Costigan & Hoare

[57] ABSTRACT

The present invention is directed to a hydrogen generating system which produces hydrogen instantaneously from water ready for use upon demand. The system includes a reactor that has reaction zones wherein catalyst and elevated temperatures generate hydrogen from steam. The zones in the reactor can be in the form of tubes about a heat generating chamber, and the zones are adapted to be interconnected to each other, to atmosphere, and to the source of steam, all to maximize the generation of hydrogen by providing a reactor of optimum flexibility.

The present invention also is directed to systems which include the hydrogen generating system and which utilize the generated hydrogen as a fuel or a chemical.

20 Claims, 27 Drawing Figures

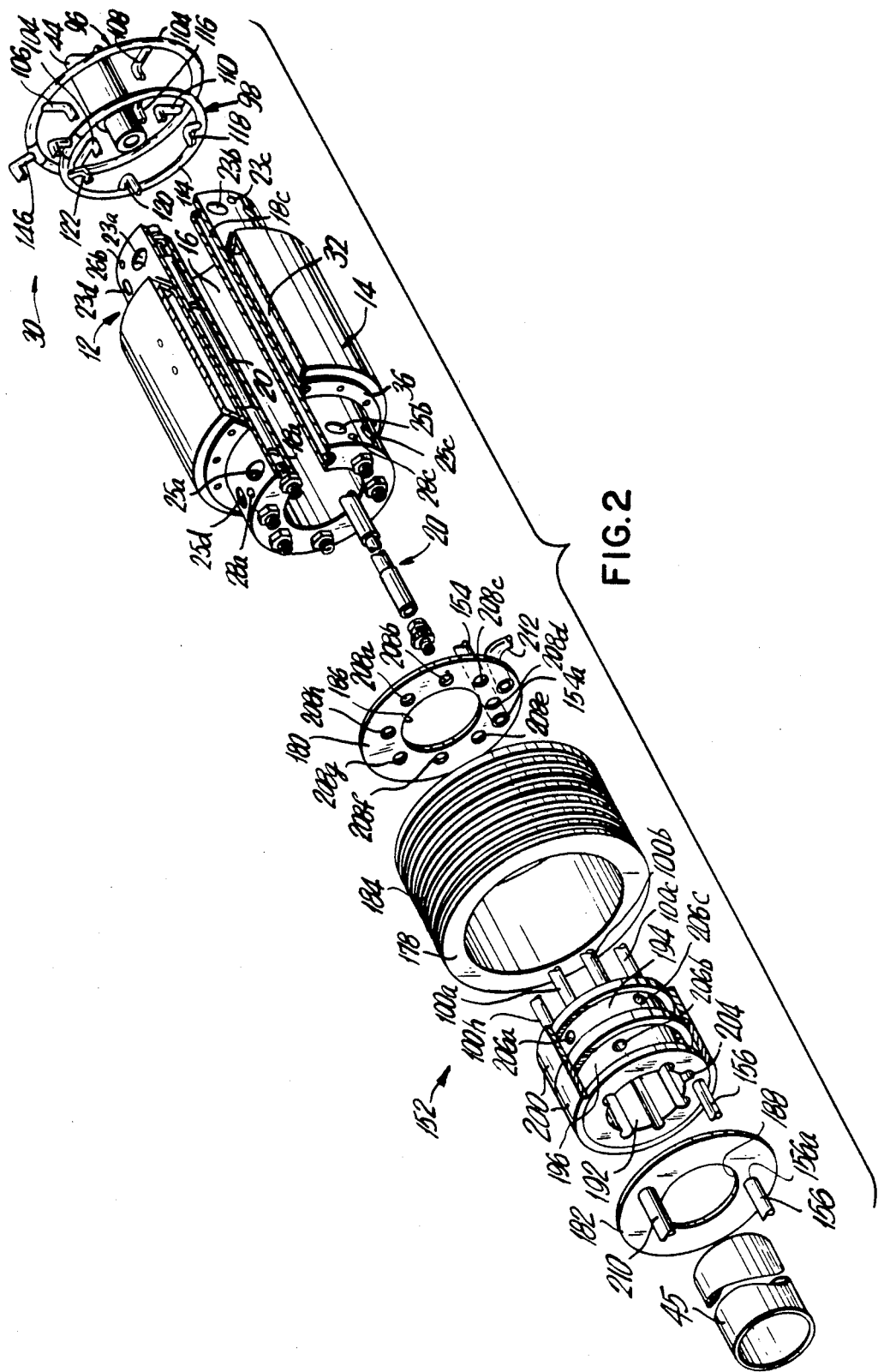

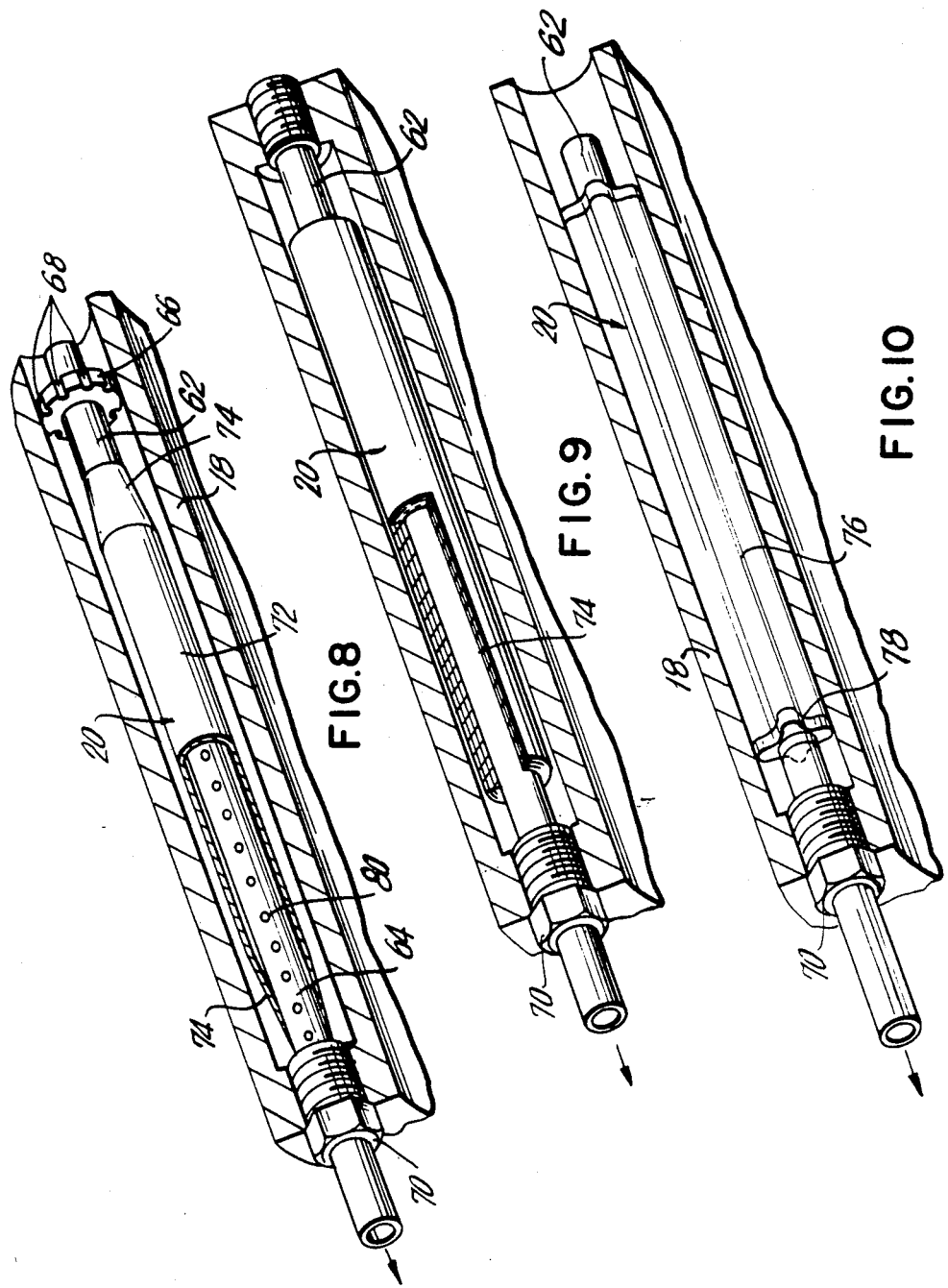

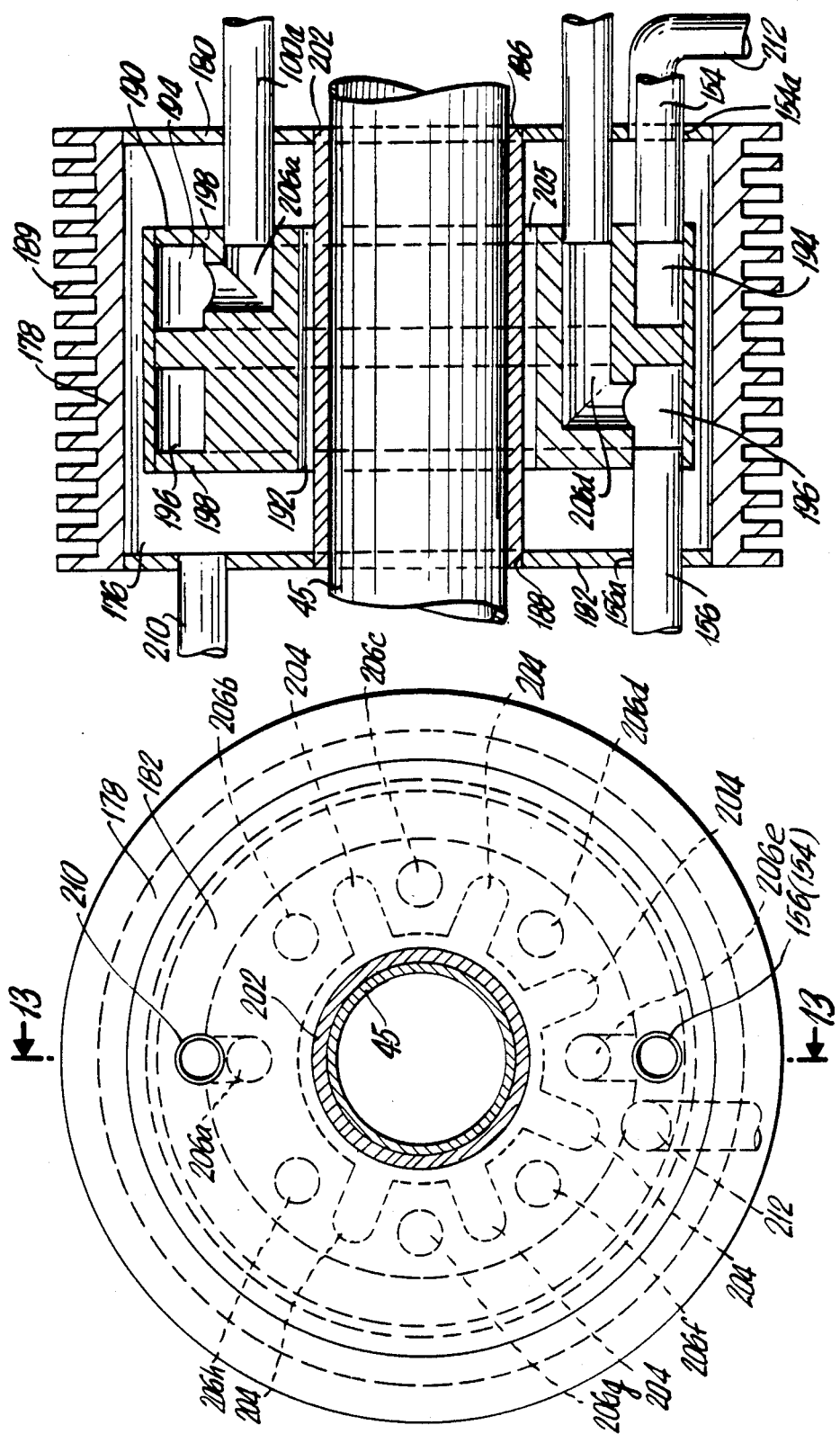

METHOD OF GENERATING HYDROGEN AND USING THE GENERATED HYDROGEN

This is a division of application Ser. No. 175,597 filed Aug. 5, 1980, now U.S. Pat. No. 4,371,500, which is a continuation of Ser. No. 921,000 filed on June 30, 1978, now abandoned.

FIELD OF INVENTION

This invention relates to a method of and apparatus for instantaneously generating hydrogen from water upon demand, where needed as needed. This invention also relates to systems which include the described method and apparatus and which utilizes the generated hydrogen.

BACKGROUND OF THE INVENTION

There is a continuing critical need to more efficiently produce hydrogen in substantial quantities for forming chemical products and in chemical processes.

Presently, large quantities of hydrogen are consumed in the manufacture of ammonia and methanol, and in producing other alcohols, nitrates and amines. Hydrogen also is used in the hydrogenation of organic compounds, such as oils and fats to make margarine and vegetable shortening.

In the steel making industry hydrogen is being used in increasing quantities in the direct reduction of iron ores to produce metallic iron which may be fed to steel making furnaces, open hearth furnaces, electric furnaces and as part of the feed for blast furnaces.

Further, hydrogen can be used for such diverse uses as the gasification and liquification of coal, the reduction of oxides of tungsten and molybdenum to the metals, the providing of high protein foods through biosynthesis of hydrogen and carbon dioxide, and in total water management programs to pasturize pathogens.

Apart from the growing need as a chemical, hydrogen, for some time, has been considered as a possible alternative to fossil fuels: oil, natural gas and coal. Hydrogen is an excellent fuel available in abundance. Water provides an undepletable supply of hydrogen. When it burns, hydrogen produces extraordinary quantities of heat and essentially pollution free water vapor useful once again as a source of more hydrogen.

Prior to the present invention, however, hydrogen has not been produced upon demand in an economic manner.

Available systems, generally, do not provide hydrogen for instantaneous use. Presently, existing systems commonly require production and storage, or substantial accumulation, before utilization. There is no direct link between production and use. Storage, a necessary element in such existing systems, prohibits instantaneous use of hydrogen upon production.

This is not meant to say that storage is necessarily detrimental. Generally, however, the consumer has not had the option of either directly using the hydrogen or storing the hydrogen and using it when needed. Presently storage is required.

In addition, available systems do not produce hydrogen economically. The price for hydrogen is not competitive with available sources of energy. Also, it often takes more energy to produce hydrogen than the energy available from the produced hydrogen.

In sum, there is a need to more efficiently produce large quantities of hydrogen for chemical purposes, and there is a pressing need to make available an economic, ecologically sound energy generating system which produces hydrogen from water adapted for instantaneous use at the option of the consumer.

It is a primary object of the invention, therefore, to provide a new and improved method of and apparatus for producing hydrogen for chemical and energy purposes.

It is another primary object of the invention to provide a new generating system which economically produces hydrogen from water adapted to be used upon demand where needed, as needed, and which is an improvement of the system of my earlier patent, U.S. Pat. No. 3,967,589.

It is another object of the invention to provide a new system which produces hydrogen from water without substantially depleting the supply of water or polluting the environment.

It is still another object of the invention to provide a new system which produces hydrogen ready for instantaneous use without the need for an intermediate storage facility.

Another object of the invention is to provide a new energy system which produces low-cost hydrogen.

Among the other objects of the invention is to provide hydrogen generating and utilizing systems for direct applications which serve human needs, such as commercial, industrial and home heating, propulsion for land, marine and aerospace vehicles, and the generation of electricity by utilities, by commercial and industrial enterprises, as well as by the homeowner.

It is still a further object of this invention to provide a new and improved hydrogen generating system for wherever hydrogen is used chemically in forming hydrogen containing products as well as for processes where hydrogen can be used advantageously.

Additional objects and advantages will be set forth in part hereinafter and in part will be obvious herefrom or may be learned with the practice of the invention, the same being realized and obtained by means of the systems and applications, recited in the appended claims.

SUMMARY OF THE INVENTION

In accordance with the present invention, there is provided a hydrogen generating system including a plurality of reaction zones which contain catalyst and which are maintained at elevated temperatures. Steam (or water) is adapted to be conveyed to each catalyst containing zone, wherein hydrogen is generated from the steam (or water), and wherein the generated hydrogen is conveyed from the zone ready for use upon demand, where needed, as needed. The invention includes forming adjacent reaction zones in a reactor containing a catalyst in each zone, and maintaining the zone at elevated temperatures, to produce hydrogen from steam fed thereinto. The zones in the reactor can be in the form of longitudinal bores or tubes which extend along the length of the reactor about a heat generating chamber. At least one end of the reactor includes transverse and radial passages, adapted to interconnect the longitudinal zones with each other, with the surrounding atmosphere and with the source for steam, all to maximize the generation of hydrogen by providing a reactor of maximum flexibility.

It is believed that hydrogen is generated by the invention because of the interaction of the high temperatures and the catalyst upon the steam (or water). At the high temperatures, it is believed the steam (or water) becomes super heated steam which tends to disassociate in the presence of the catalyst, to produce hydrogen gas. In any event, by practice of the invention, hydrogen is produced from water which is instantaneously available for use either as an essentially pollution free fuel, which, when burned, again produces water, or as a chemical wherever hydrogen is required in products or processes.

The catalyst of the system, generally, is metallic and contains innumerable sites on its surface, which, with the elevated temperature in each zone, effect the generation of hydrogen. Illustratively, the catalyst is formed of a web-like cellular structure defined by interconnected metal filaments comprising iron, copper, silver, nickel, palladium, platinum, or iron-nickel and molybdenum.

Where the catalyst becomes deactivated because of use in the present invention, it is regenerated, in situ. For example, the innumerable reaction sites on a catalyst surface of iron will become oxidized by the steam to produce hydrogen gas until the sites are oxidized. In such instance, the catalyst sites become deactivated. To reactivate the sites a reducing agent, such as hydrogen or hydrocarbons or mixtures thereof, can be used. Once reactivated, steam can be fed to such catalyst to once again generate hydrogen.

As used herein, the term "deactivation" describes the condition of the catalyst when it is no longer substantially effective as a catalyst in the production of hydrogen, and the term "activated" describes the condition of the catalyst when it is effective in the production of substantial quantities of hydrogen.

In this embodiment of the invention, the generating system includes control means, responsive to the deactivation of the catalyst, adapted to halt the supply of steam to the zone containing such catalyst and to provide a catalyst regeneration agent which, once again, activates the catalyst. At such time the control means are adapted to reverse the process by halting the supply of the regenerating agent and by supplying steam to the reaction zone for the generation of hydrogen.

A conduit system at each end of the reactor and connected to the zones or tubes conveys fluid to and from the reactor. At one end, e.g., upstream of the reactor, a control conduit circuit selectively provides to the tubes or zones steam from a steam generator for the production of hydrogen and a reducing agent, such as hydrogen or hydrocarbon, to the tubes for the reactivation of the catalyst. At the other end, e.g., downstream, the conduit system conveys fluids from the reactor, including the hydrogen generated within the reactor.

Once the system is in full operation selected zones or tubes will contain an active catalyst while adjacent zones or tubes will contain deactivated catalyst. Under such conditions the control conduit circuit concurrently provides steam to each tube containing active catalyst and a reducing agent, such as hydrogen, to each tube containing deactivated catalyst. In each active zone to which steam is supplied, the elevated temperatures and catalyst decompose the steam to produce hydrogen gas. This reaction is endothermic in nature because the heat is absorbed by the reaction. Simultaneously, in each deactivated zone to which hydrogen is supplied, the reducing agent reacts with the oxidized catalyst to remove the oxygen from the catalyst surface to thereby regenerate or reactivate the catalyst. This reaction produces water and is exothermic in nature because heat is generated by the reaction. By conducting the described reactions in adjacent zones, the exothermic heat is used to increase the production of hydrogen by further elevating the temperatures in a juxtaposed hydrogen generating zone.

To provide these concurrent reactions in adjacent zones, initially, the steam can be supplied to one zone while nothing is supplied to the adjacent zone. Once the catalyst is deactivated in the one zone, concurrent operation can be commenced. For example, when there are eight zones positioned circumferentially about the heat generating chamber, initially steam can be supplied to every other zone (a set of four zones). Once the catalyst in such every other zone becomes deactivated, then concurrent operations are commenced so that the exothermic reactivating reaction occurs in such every other zone while the endothermic hydrogen reaction occurs in the alternate adjacent zones (a second set of four zones) with the aid of the exothermic heat.

Preferably, means are provided at the other end (downstream) of the reaction zones which can determine when the tubes are no longer producing hydrogen because of deactivation of the catalyst. At this time the control conduit circuit can cease providing steam to the non-productive tubes and begin providing the hydrogen or hydrocarbons to such tubes to reactivate them. Once the catalyst has been regenerated the means will determine that regenerating hydrogen is being conveyed through that tube so that the control conduit circuit can reverse the described procedure and begin to supply steam to the reactivated catalyst.

In the embodiment of the invention where the catalyst is not deactivated by the steam, e.g., a catalyst formed from a platinum type of metal, the conduit system can continuously supply steam to each reactor tube and continuously convey the generated hydrogen therefrom.

In each embodiment of the invention the generating system can include downstream cooling means for reducing the temperature of hydrogen and other fluids conveyed from the reactor. In doing so meaningful reformation of the hydrogen and oxygen to form water is prohibited and the temperature of the fluids is reduced to make them easier to handle by components of the system which separate and collect fluids, as hereafter described in more detail.

In addition, as hereafter explained in more detail, the method and apparatus of the present invention can be included in systems which utilize hydrogen to form chemical products and in chemical processes, as well as in systems which use hydrogen as a fuel for such diverse applications as heating, propulsion and electricity.

BRIEF DESCRIPTION OF THE DRAWINGS AND ILLUSTRATIVE EMBODIMENT OF THE INVENTION

The following is a detailed description together with accompanying drawings of preferred and illustrative embodiments of the invention. It is to be understood that the invention is capable of modification and variation apparent to those skilled in the art within the spirit and scope of the invention.

In the drawings:

FIG. 2 is an exploded, perspective view of the embodiment of the inventron shown in FIG. 1, wherein structure of several components of the system have been partially broken away to show details thereof.

FIG. 8 is a longitudinal sectional view of a tube of the reactor containing still another embodiment of the catalyst system of the invention.

FIG. 9 is a longitudinal sectional view of a tube of the reactor containing still another embodiment of the catalyst system of the invention.

FIG. 10 is a longitudinal sectional view of a tube of the reactor containing still another embodiment of the catalyst system of the invention.

FIG. 12 is an end view of the downstream end of the cooling means of the hydrogen generating system.

FIG. 13 is a cross-sectional view of the cooling means of the hydrogen generating system taken along the lines 13—13 of FIG. 12.

FIGS. 1-14

Figure 1:
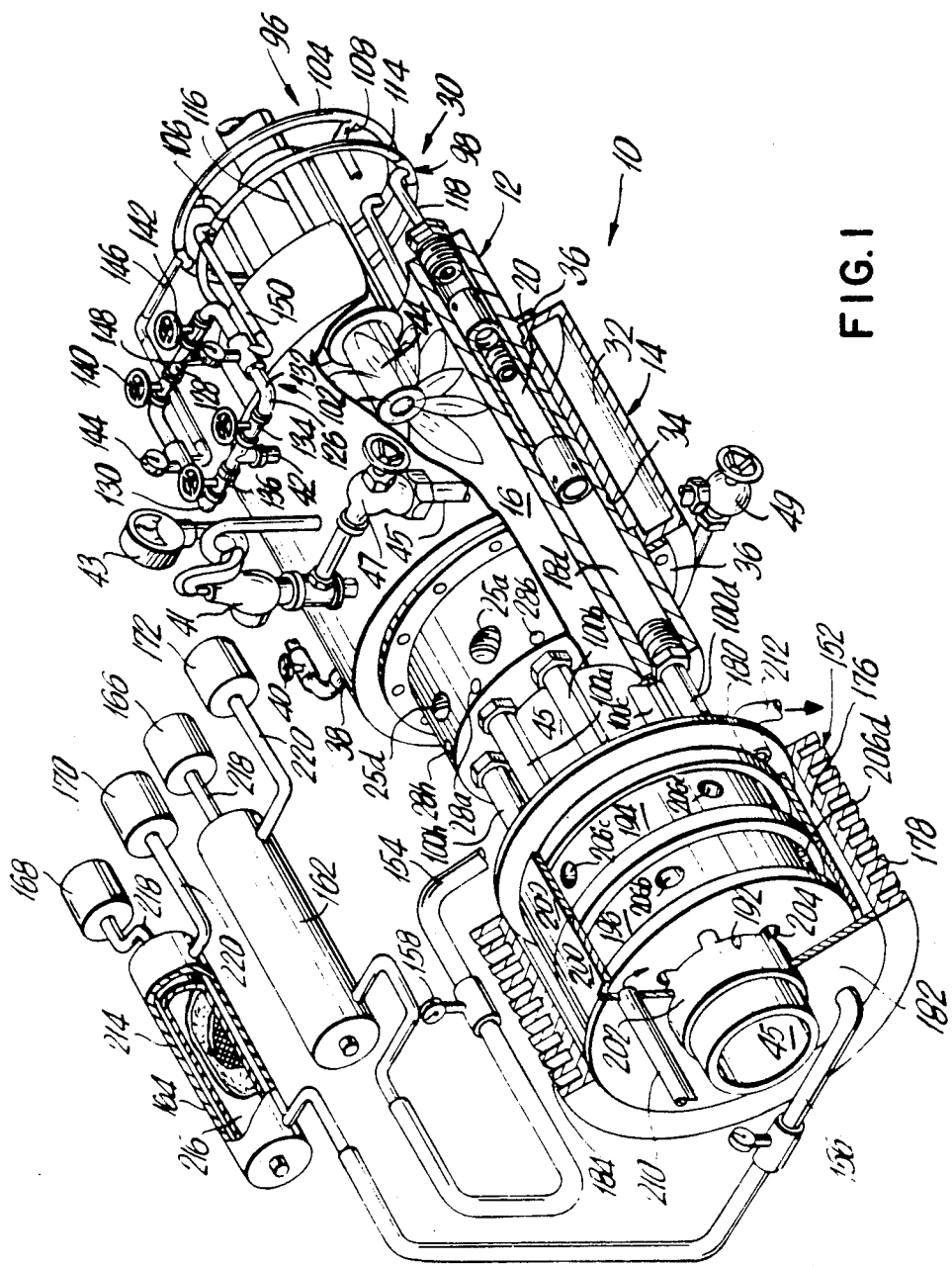
FIG. 1 is a perspective view of one embodiment of the invention.

Referring first to FIGS. 1-2, there is shown a preferred embodiment of the system 10 of the invention for producing hydrogen from water upon demand, where needed, as needed The system 10 includes a cylindrical reactor 12 about which is a cylindrical boiler or steam generator 14 in which steam is generated for the reactor 12. The reactor 12 has a heat generating chamber 16 disposed centrally of a plurality of longitudinally extending, circumferentially spaced zones in the form of eight bores or tubes 18a-h having a catalyst 20 in each tube. At each end of the tubes 18a-h are transverse passages 22a-d -25a-d and radial passages 26a-h and 28a-h for selectively connecting the tubes 18a-h with each other, with the surrounding atmosphere, and with the steam generator 14. As shown, a network of conduits, generally identified the reactor 12 and boiler 14.

Steam Generator

The steam generator or boiler 14 includes an annular chamber 32 which extends the length thereof for receiving water and generating steam for the reactor 12. Extending through the boiler 14 is a central opening 34 for slidably fitting the boiler 14 about the central portion of the reactor 12 where it is secured thereto by flanges 36.

A conduit 38 is connected into the lower portion of the chamber 32 for conveying water from a source (not shown) to the boiler 14 through a control valve 40. On the opposite side of the boiler 14, a conduit 42 is connected into the upper portion of the chamber 32 for conveying steam to the reactor 12.

As shown the boiler 14 includes a pressure relief valve 41, a pressure gauge 43, and a sight glass assembly 45 with an upper valve 47 to monitor the level of the water in the boiler and with a valve 49 for drainage.

Reactor

In the embodiment of the invention shown in FIGS. 1 and 2, the cylindrical reactor 12 is integral being formed of a solid piece of metal with a large longitudinal central bore therethrough which forms the heat generating chamber 16 and with eight smaller longitudinal bores therethrough circumferentially positioned about the chamber 16 which form equidistant reaction zones or tubes 18a-h.

In the illustrative embodiment, a burner 44 is positioned within the upstream portion of the chamber 16 to provide heat from combustion derived from the fuel that issues from the burner 44. This heat is sufficient to generate steam from water in the boiler 14 and to facilitate and cause the reactions within the zones or tubes 18a-h for the generation of hydrogen. The burner 44 is positioned within chamber 16 so that the flame therefrom contacts the portion u of the tubes 18a-h which contain three catalyst 20. In other embodiments of the invention, described hereafter, the heat source required for the system of the invention can be provided by rejected waste heat, or other suitable sources.

Extending from the chamber 16 is an exhaust conduit 45 for conveying the exhaust from the system.

Figure 3:
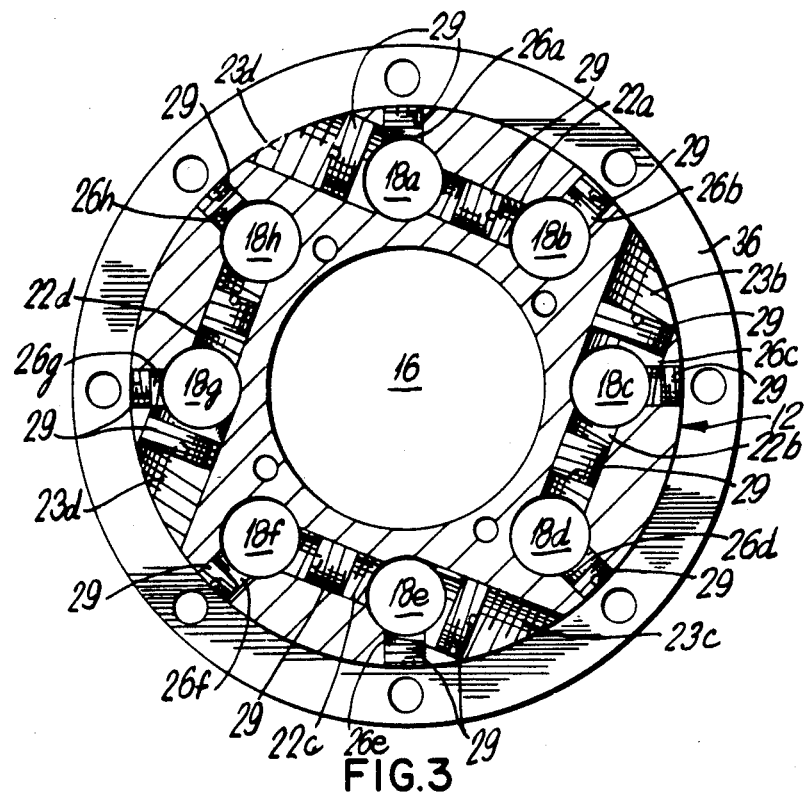
FIG. 3 is a cross-sectional view of the upstream end of the reactor.
Figure 4:
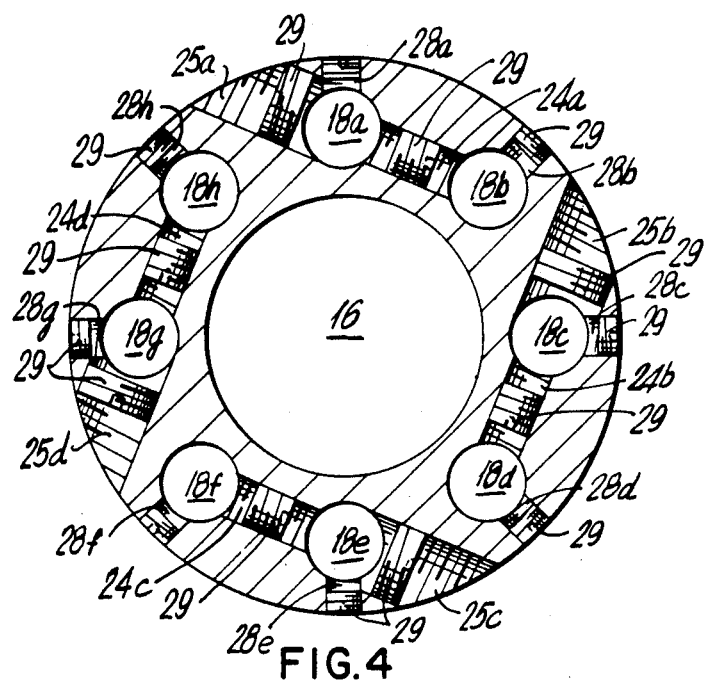
FIG. 4 is a cross-sectional view of the downstream end of the reactor, taken along the lines 4—4 of FIG. 1.

As shown in FIGS. 3 and 4, the ends of the tubes 18a-h (upstream and downstream) are connected in pairs by transverse bores 22a, b, c and d, and 24a, b, c and d, respectively. Each transverse bore extends between two longitudinal tubes, e.g., upstream transverse bore 22a interconnects the upstream ends of longitudinal bores 18a and b while downstream transverse bore 24a interconnects the downstream ends of the same tubes 18a and b. For access, additional upstream and downstream transverse bores 23a, b, c and d, and 25a, b, c and d extend from one of each of the interconnected pairs of the longitudinal bores, i.e., 18a, c, e, g, at the upstream and downstream ends thereof through the outer reactor wall. As shown, the transverse bores, e.g., upstream bores 22a, 23a, etc., downstream bores 24a, 25a, etc., are coaxial with the outer access bores, e.g., 23a and 25a being of greater breadth.

Also, the reactor 12 includes the radial bores 26a-h and 28a-h which extend radially outward from each tube 18a-h at the end thereof, upstream and downstream respectively, through the outer wall of the reactor 12.

Thus, at each end of the reactor 12, the longitudinal tubes 18a-h are interconnected in pairs by transverse bores 22a-d and 24a-d; are connected to surrounding atmosphere by both the transverse access bores 23a-d and 25a-d and the radial bores 26a-h and 28a-h; and are adapted to be connected as will be described hereinafter, to the steam generator 14 via the radial bores 26a-h and 28a-h.

Moreover, accessibility and interconnectability are selective. As shown, each of these bores and passages have threaded portions for the receipt of correspondingly threaded plugs 29 having slotted heads for such purposes. As desired, these plugs 29 may be removed for the passage of steam between adjacent tubes, e.g., tubes 18a, 18b, etc., for the passage of steam through one or more radial bores, e.g., 26a or 28a, etc., for drainage of the tubes 18a-h through the same radial bores, or for access to the interconnecting transverse bores, e.g., upstream transverse bore 22a via bore 23a, etc. In the illustrative embodiment, all the plugs 29 are in place so that pairs of tubes are not interconnected, e.g., 18a is not connected to 18b via upstream transverse bore 22a, and the tubes are not open to atmosphere such as by radial bores 26a-h.

How removal of selected plugs 29 provides flexibility for the reactor 12 is demonstrated hereinafter in connection with several embodiments of the invention.

Catalyst Systems

As illustrated in FIGS. 1 and 2, within the tubes 18a-h of the reactor 12, are catalyst systems 20 of the invention for facilitating and causing the separation of water vapor into hydrogen and oxygen.

In FIGS. 5-10 there are illustrated various embodiments of the catalyst systems 20.

Figure 5:
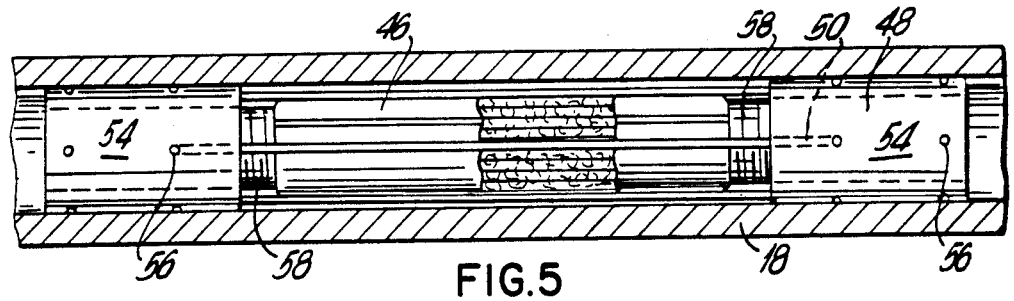
FIG. 5 is a longitudinal sectional view of a tube of the reactor containing one embodiment of the catalyst system of the invention.

In the embodiment of the catalyst system shown in FIG. 5, there is illustrated the catalyst 20 in the form of a spirally wound sheet 46 positioned within the tubes 18a-h between two hollow end caps 48 held together by wire 50 to form a cartridge slidably mounted within each tube 18. Each cap 48 has a hollow sleeve 54 having holes 56 drilled therethrough for the wire 50 and from which a hollow plug 58 extends inwardly for abutment against the spirally wound catalyst 20.

Figure 6:
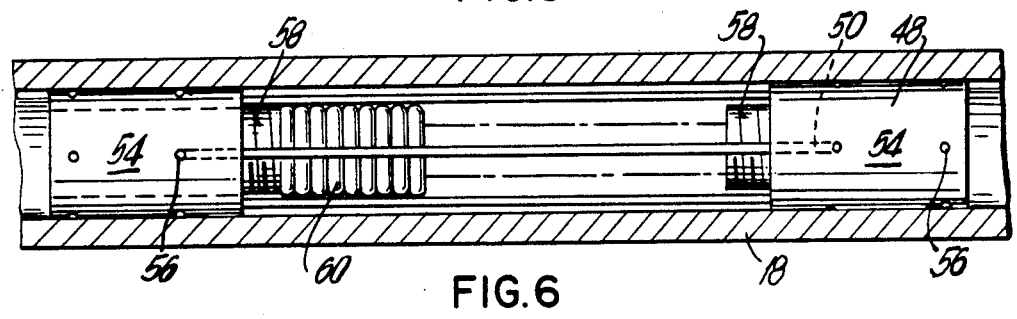
FIG. 6 is a longitudinal sectional view of a tube of the reactor containing another embodiment of the catalyst system of the invention.
Figure 7:
FIG. 7 is a magnified view of a portion of the catalyst of either FIGS. 5 or 6.

In the embodiment of the catalyst system 20 shown in FIG. 6, the catalyst 20 is cut from the sheet 46 into a number of discs 60 juxtaposed between the porous end caps 48 and held together by the wire 50 to form the slidably mounted cartridge.

As shown in the magnification of the catalyst 20 (FIG. 7) the catalyst preferably is formed from a powdered metal product defining a web-like, three dimensional, cellular structure in which the metal provides a network of interconnected metal filaments with interconnected, asymmetrical spaces or cells therebetween. By reasons of the network-like, porous, cellular structure, the metal provides large surface areas which are reactive sites. The metals which can be used for the catalyst include iron, iron-nickel copper and molybdenum, palladium, and platinum. Several of these catalysts have been made available by Foammetal Inc. of Willoughby, Ohio, under the designation foametal, and are described in its 1974 brochure entitled "LOW DENSITY FOAMETAL, A Study Of Surface Area, Texture, Cell Size And Filament Diameters".

In use, the porous catalyst systems 20 provide countless sites, which, with elevated temperatures, cause the steam to disassociate to form hydrogen gas.

Where the catalyst reacts with the steam, e.g., a catalyst formed of iron, the countless sites are oxidized to produce an oxidized metal surface and hydrogen gas. The decomposition of the steam passing therethrough will continue until the metal essentially becomes coated with oxygen at which time the catalyst becomes deactivated. To regenerate the countless sites, hydrogen can be fed through the tubes 18a-h into contact with the catalyst 20 where the hydrogen reacts with the oxygen on the metal surface to form water vapor and a free metal surface.

As will be described hereafter in rore detail, decomposition of the water to provide freed hydrogen occurs with the iron catalyst system 20 in one tube 18, e.g., 18a, while oxygen is removed from the iron catalyst system 20 in the adjacent tube 18, e.g., 18b. In doing so the heat of the exothermic reaction, which occurs in the tube 18 where oxygen is removed from the catalyst 20, is used to increase the oxidation of the catalyst 20 in the adjacent tube 18 which produces hydrogen gas from steam.

Where the catalyst causes disassociation without reacting with the steam, e.g., a platinum type catalyst, the water disassociates to form hydrogen and oxygen gases. In these embodiments the catalyst will not become deactivated under normal operating conditions so that hydrogen gas can be produced in all the reactor tubes, e.g., 18a-h.

In the illustrative embodiments of the catalyst systems 20 of FIGS. 8, 9 and 10, the catalysts are formed from the platinum type metals and alloys of Group VIIIB elements, and particularly platinum and palladium metals and alloys. These platinum type catalysts are sufficiently porous so as to allow the permeation or diffusion of hydrogen therethrough while prohibiting the passage of water vapor and oxygen. These catalysts form a web-like cellular structure defined by interconnected platinum type metal filaments which prohibit the passage of the larger water vapor molecules and oxygen, but which permit the smaller hydrogen atoms to pass therethrough.

Moreover, the platinum type metal catalysts of the invention are essentially self-sustaining under normal operating conditions. They do not become readily deactivated. They can remain active for extremely long periods of time.

As shown in FIGS. 8-10 the catalyst systems 20 include a conduit 62 which extends through the catalyst and which is slidably and removably secured and positioned within a reactor tube 18. The conduit 62 has a central portion 64 about which the catalyst 20 is mounted and through which the diffused hydrogen can pass.

About one end of the conduit 62 (upstream), which extends from the catalyst 20, there is a supporting and metering disk 66 (FIG. 8) having a slip fit with respect to the conduit 62 an having a sliding fit with respect to the reactor tube 18. About the outer portion of the disk 66 are a plurality of U-shaped grooves 68 for directing and metering the passage of steam downstream about the catalyst into the space between the walls of the tube 18 and the outer periphery of the catalyst 20.

About the other end of the conduit 62 (downstream), which also extends from the catalyst 20, there is a plug 70 welded to the conduit that is threaded for reception by a correspondingly threaded end of the reactor tube 18 for positioning and securing the catalyst system 20 in a gas tight relationship in the reactor 12.

In the illustrative embodiment shown in FIG. 8 the hydrogen porous platinum type metal catalyst 20 is in the form of a plurality superimposed tubes 72 where the openings in each tube generally are non-aligned or asymmetrical to facilitate the separation of the generated hydrogen from the other fluids in the reactor tubes 18. As shown, there are two such superimposed hexagonally-shaped tubes 72 which are fused together and which have ends 74 that are tapered inwardly to the conduit 62 to contain the diffused hydrogen.

In the embodiment of FIG. 9, the already described catalyst 20 is in the form of a multi-layered spiral wound material bonded together to form a continuous maze of increased surface area for diffusion of hydrogen.

In the embodiment shown in FIG. 10, the described catalyst is multi-layered with a central core 76 from which extend a plurality of radial webs or wings 78 along a length thereof to provide the increased surface area. The catalyst 20 is X-shaped with four radially extending webs 78.

With respect to the central portion 64 of the conduit 62, it can be made of a hydrogen permeable metal, such as the platinum type metals (see FIG. 9). In this embodiment the ends of the conduit 62 are formed from an inert non-diffusable metal, such as stainless steel, welded to the central porous portion 64

As shown in FIG. 8, the conduit 62 of the catalyst system 20 also can have perforations 80 in the central portion 64 thereof for the reception and passage of diffused hydrogen. In this instance the entire conduit 62 can be made from stainless steel or other inert, non diffusable metals.

In the embodiments (FIGS. 8 and 10) the diffused or permeated hydrogen passes through the conduit 62 while the remaining fluids (water, vapor and oxygen) flow through the space between the catalyst 20 and reactor tube 18 through passages in the other end of the reactor 12.

Further, in these illustrative embodiments one end of each conduit 62 is closed (upstream) so that the incoming steam cannot flow directly into the conduit 62. Instead it flows about the catalyst 20 as has been described.

In an embodiment of the catalyst system 20, such as shown in FIG. 9, the steam can be fed into conduit 62 and the hydrogen can diffuse through the hydrogen permeable central portion 64 and catalyst 20 into the reactor tube 18, while the remaining fluids pass downstream through the conduit 62.

Conduit System

As an introduction to the conduit system 30, and in addition to the conduits already described, the system 30 conveys fluids to and from the reactor 12 by upstream manifolds 96 and 98 and downstream conduits 100a–h, and controls the flow of fluids through the reactor 12 by a control circuit connected to the upstream manifolds 96 and 98.

Figure 11:
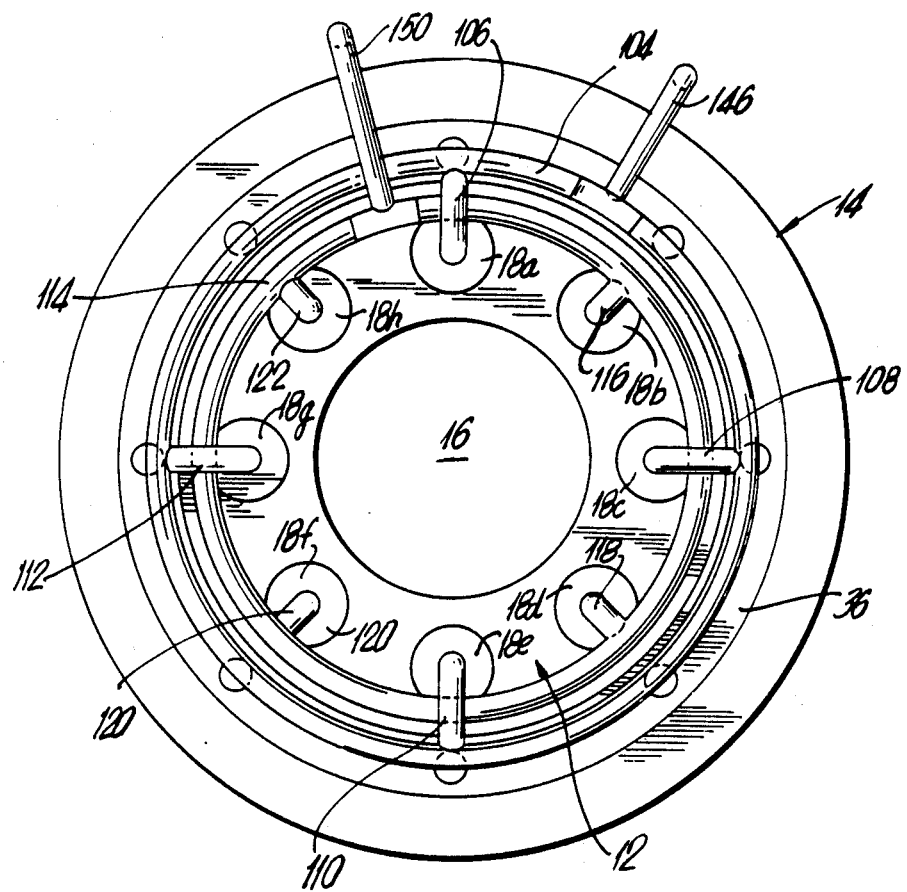
FIG. 11 is an end view of the upstream end of the reactor of the hydrogen generating system.

In general, there are a pair of manifolds (96 and 98) upstream of the reactor 12, for conveying fluids thereto, wherein each manifold has a circular conduit and four spoke or branch like conduits which extend therefrom and which are connected to four tubes 18. Specifically:

the upstream manifold 96 has a circular conduit 104 and four inwardly extending L-shaped curved conduits 106, 108, 110 and 112 threadably and removably connected to longitudinal bores 18a, c, e and g in a fluid tight relationship (See FIGS. 1, 2 and 11); and the upstream manifold 98 has a circular conduit 114 and four inwardly extending L-shaped curved conduits 116, 118, 120 and 122 threadably and removably connected to longitudinal bores 18b, d, f and h in a fluid tight relationship (See FIGS. 1, 2 and 11).

The control circuit 102 controls the flow of fluids to and through the reactor 12 by selectively providing steam to produce hydrogen, and, as necessary, hydrogen to reactivate the catalyst in the tubes 18a–h.

In the illustrative embodiment, the tubes 18 operate in two sets of four tubes each. When on stream, hydrogen will be generated in four tubes, e.g., 18a, c, e and g, while the catalyst 20 will be regenerated in the tubes 18b, d, f and h, between or adjacent to the first set of tubes 18a, c, e and g. This process will be reversed when the catalyst 20 in tubes 18a, c, e and g becomes deactivated while the catalyst 20 in tubes 18b, d, f and h has become regenerated. During each cycle, moreover, the reaction in the tubes where catalyst regeneration is occurring will provide heat which increases the amount of hydrogen being generated from steam in adjacent tubes.

In the illustrative embodiment of the invention shown in FIGS. 1 and 2, the circuit 102 includes a rectangularly shaped loop above the boiler 14 which has four legs: two transverse legs 126 and 128, and two longitudinal legs 130 and 132.

Centrally connected into the transverse leg 126 is the steam conduit 42 with valves 134 and 136 on either side thereof. Correspondingly, centrally connected into the transverse leg 128 is a conduit 138 which conveys a regeneration agent, such as hydrogen, from a source (not shown) for the regeneration of catalyst 20. Here too valves 140 and 142 are connected into the transverse leg 128 on either side of conduit 138.

Centrally connected into the longitudinal leg 130 is a pressure gauge 144 for measuring and controlling steam pressure, and a conduit 146 for selectively conveying steam or regenerating agent to manifold 96. Similarly centrally connected into the longitudinal leg 132 is a pressure gauge 148 also for measuring and controlling steam pressure, and a conduit 150 for selectively conveying steam or regenerating agent to manifold 98. Typically, the steam supplied to the reaction tubes 18a–h can be at a controlled pressure of about 3 p.s.i.g.

Downstream of the reactor are the conduits 100a–h connected in fluid tight relationship to the downstream end of the tubes 18a–h for conveying fluids, generated hydrogen, oxygen and water vapor therefrom. From these conduits 100a–h the fluids are conveyed into a temperature reducing means 152 where the fluids are collected and cooled. From the temperature reducing means 152, a pair of conduits 154 and 156 convey the fluids through gas detectors 158 and 160, which measure the yield of hydrogen, and into separators 162 and 164, where the fluids are separated with the hydrogen being conveyed to the collectors 166 and 168 and the other fluids being conveyed to collectors or separators 170 and 172.

The temperature reducing means 152 lowers the temperatures of the fluids to increase the yield of hydrogen. Cooling prevents the gases formed from the steam, hydrogen and oxygen, from reforming into water vapor or water. The reduction in temperature also makes the fluids easier to handle downstream.

In the illustrative embodiment shown in FIGS. 1, 2, 12 and 13, the temperature reducing means 152 is a water cooled heat exchanger or quencher having a shell which includes a chamber 176 formed by a cylindrical housing 178 and upstream and downstream end plates 180 and 182 welded to the inner periphery at the upstream and downstream ends of the housing 178. The cylindrical housing includes a series of fins 184 to increase the surface area for cooling purposes, and the upstream and downstream end plates 180 and 182 include central openings 186 and 188 therethrough.

Positioned within the chamber 176 spaced from the housing 178 and end plates 180 and 182 for the circulation of a cooling medium, such as water, the quencher 152 includes manifold 190 having a central opening 192 therethrough and two outer annular chambers 194 and 196 formed by spaced annular partitions 198 and an outer two segmented cover 200 welded thereto. Extending through the central openings 186, 188 and 192 of the end plates 180 and 182 and the manifold 190 is an inner tube 202 which is welded to the inner periphery of the end plates 180 and 182. The manifold 190 also includes a plurality of the longitudinal grooves 204 therethrough which, with the space 205 between the inner tube 202 and the manifold 192 define passages to facilitate the flow and effectiveness of the cooling medium.

Extending from the upstream end of the manifold 190 there are eight passageways 206a–h therewithin: four passageways 206a, c, e and g extend into one annular chamber 194 and four passageways 206b, d, f and h extend into the other annular chamber 196. In the illustrative embodiment the downstream conduits 100a, c, e and g extend through bores 208a, c, e, and h in the upsteam end plate 180 and are connected in a fluid type relationship into one set of passageways 206a, c, e and g while the other downstream conduits 100b, d, f and h extend through bores 208b, d, f and h in plate 180 and are connected in a fluid type relationship into the other set of passageways 206b, d, f and h.

In use, fluids from the reactor 12 are conveyed through the conduits 100a–h and into the chambers 194 and 196 via the appropriate set of passageways 206a, c, e and g or 206b, d, f and h. For cooling these fluids, a conduit 210 is connected into the downstream end plate 182 which conveys a cooling medium such as water, from a source (not shown) into the quencher chamber 176. For conveying the cooling medium from the chamber 176, a conduit 212 is connected to the upstream end plate 180 and a reservoir (not shown). Within the chamber 176, the cooling medium flows about the manifold 190 and through the grooves 204 and space 205 about the inner tube 202 to reduce the temperature of the reactor fluids collected in the annular chambers 194 and 196.

For conveying the cooled reactor fluids downstream of the quencher 152 the conduits 154 and 156 extend from the annular chambers 194 and 196, respectively, and through bores 154a and 156a in the end plates 180 and 182.

The downstream gas detectors 158 and 160 provide a control over the productivity of the reactor 12 and the reactivation of catalyst 20 in the tubes 18a–h. The gas detectors 158 and 160 indicate whether hydrogen is being generated within each set of four tubes 18a, c, e and g, and 18b, d, f and h. When a gas detector 158 or 160 shows little, or no hydrogen is being conveyed through the appropriate conduit 154 or 156, this normally indicates that the catalyst 20 in the operatively connected tubes 18 has been deactivated. The sequencing of valves 134, 136, 140 and 142 in the upstream control circuit 102 then is set to provide hydrogen and not steam to the appropriate set of tubes to reactivate or regenerate the catalyst 20 therein. When the gas detector 158 or 160 again provides high hydrogen readings this indicates that regeneration of catalyst has occurred and the steam cycle can commence again. At such time the sequencing of the valves 134, 136, 140 and 142 is reset to shut off the supply of hydrogen to such catalyst and to convey a fresh supply of steam thereto.

In the illustrative embodiment, the gas indicators 158 and 160 are read by an operator and the valves 134, 136, 140 and 142 are set and reset manually. It is within the scope of this invention to provide for automatic means to open and close the valves 134, 136, 140 and 142 responsive to the detection of hydrogen or other fluids in the conduits 154 and 156. Such automatic means can be electrical, hydraulic, pneumatic or mechanical, or a combination of such means.

Downstream of the quencher 152 and gas detectors 158 and 160, the cooled fluids are separated with the hydrogen and oxygen ready for use or collection. In the illustrative embodiment the separators 162 and 164 are those disclosed in my earlier U.S. Pat. No. 3,967,589. Each separator 162 or 164 includes a tubular housing 214 in which there is disposed an active microporous asymmetric membrane 216. The membrane 216 is a thin, selectively permeable film having a porous supporting substrate which has been rolled to form a tubular asymmetric microporous membrane. These membranes are sold by the Roga Division of Universal Oil Products, Company, 2980 Harbor Dr., San Diego, Calif. 92101 and are described in its brochure, Membrane Production of Nitrogen Enriched Air For Fuel Tank Blanketing Applications, dated September 1974.

Extending through each membrane 216 and from the downstream end of the housing 214 is a conduit 218 having perforations 219 (FIG. 14) along the length which lies within the membrane 216 Also, extending from the downstream side of each housing 214 is a conduit 220 which opens into space between the membrane 216 and housing 214.

As the fluids are conveyed from the conduits 154 and 156 into each housing 214, the pressure of the fluids and the porosity of each membrane 216 is such so as to allow only hydrogen to be diffused therethrough. The separated hydrogen then passes through the perforations 219 in each conduit 218 and is conveyed downstream ready for use.

At the same time the oxygen and water collected in each housing 214 about each membrane 216 is conveyed downstream by the conduit 220 where the oxygen can be separated from the water and used as desired.

As shown in the illustrative embodiment, the separated hydrogen in each conduit 218 and the oxygen and water vapor in each conduit 220 can be fed into the appropriate collectors and separators 166, 168, 170 and 172.

Operation

Referring first to FIG. 1, at start up, the valves 134, 136, 140 and 142 are closed. Water, as needed, is supplied to the boiler 14 through conduit 38 and fuel is supplied to the burner 44 and ignited, to thereby provide heat for the generation of steam and heat for the tubes 18a-h and catalysts 20 therein. When steam has been generated, valve 136 is opened and the steam at a controlled pressure and flow rate is supplied to a set of four tubes, e.g., tubes 18a, c, e and g, via the upstream conduit 146 and manifold 96, wherein the steam is elevated to temperatures at which it reacts with the catalyst 20 in these tubes 18 to form hydrogen and minor amounts of water vapor and oxygen. These fluids are conveyed from tubes 18a, c, e and g through the downstream conduits 100a, c, e, and g and into quencher chamber 194 where the temperature of the fluid is reduced by water circulating through the chamber 176 and grooves 204 to inhibit reformation of the hydrogen and oxygen gases. From the quencher 152 the cooled fluids are conveyed into and through the separator 162 where only the hydrogen diffuses through the membrane 216 into the conduit 218 and is conveyed to the collector 166 ready for use. At the same time the non-diffused fluids (oxygen and water vapor) pass through the housing 214 and into the conduit 220 and collector 170 for further processing, as desired.

This start up operation will continue until the downstream gas detector 158 indicates that meaningful quantities of hydrogen are not being generated in the tubes 18a, c, e and g. This reading shows that the catalyst 20 therein has been oxidized and become deactivated.

Figure 14:
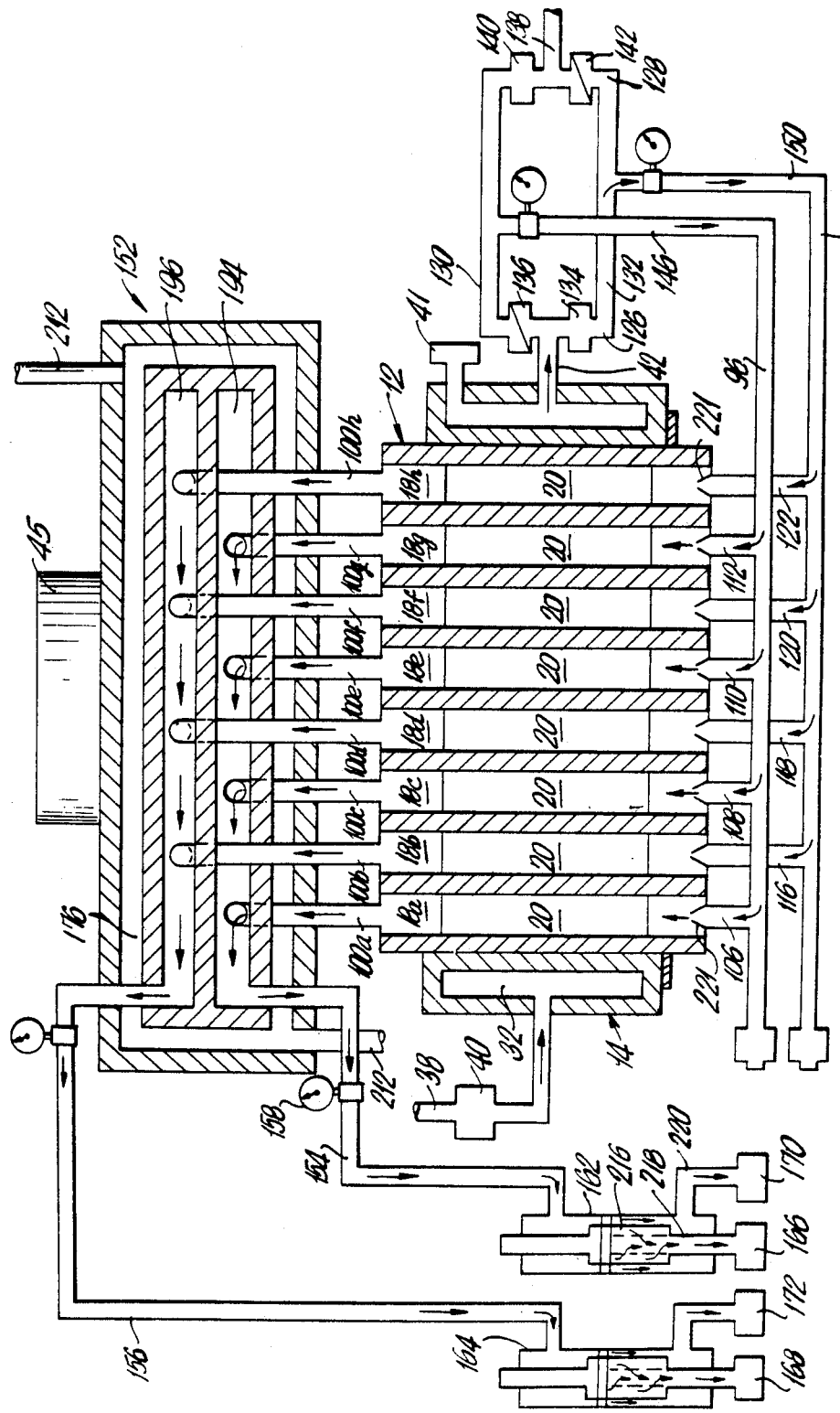
FIG. 14 is a planar view, diagrammatically illustrating the interrelationship between the components and operation of the system shown in FIGS. 1-2, and includes metering devices at the upstream end at each of the reaction tubes.

At such time, and now referring to FIG. 14, valve 136 is closed and valve 140 is opened to provide hydrogen to the tubes 18a, c, e and g via upstream conduit 146 and manifold 96 to regenerate the catalyst 20 therein. Concurrently valve 134 is opened to provide steam to the other set of tubes 18b, d, f and h, via the upstream conduit 150 and manifold 98, wherein the steam reacts with catalyst 20 therein to produce hydrogen gas and minor amounts of water vapor and oxygen.

With these ongoing concurrent operations, the heat from the exothermic reaction occurring in tubes 18b, d, f and g is used to generate hydrogen occurring in the adjacent tubes 18a, c, e and g. Also, the amount of fuel being supplied to the burner 44 can be reduced because of the heat from the exothermic reaction is being used to generate hydrogen.

From the reactor 12 the generated hydrogen and minor amounts of oxygen and water vapor are conveyed from tubes 18b, d, f and h through the conduits 100b, d, f and h into the quencher chamber 196. Simultaneously, fluids, water vapor and gases, are conveyed from the reactor tubes 18a, c, e and g, wherein the catalyst is being reactivated, through the downstream conduits 100a, c, e and g into the quencher chamber 194. The fluids in the quencher 152 are cooled by the water flowing therethrough to reduce the temperature thereof to inhibit reformation of the gases. As shown in FIG. 14, from the quencher 152 the fluids in chambers 94 and 196 are fed into the separators 162 and 164 via conduits 154 and 156 for recovering the hydrogen generated in tubes 18b, d, f and h, as well as any residual amounts of hydrogen not consumed in the reaction in regenerating the catalyst 20 in tubes 18a, c, e, and g. In each separator 162 or 164 hydrogen diffuses through each membrane 216 and perforations 219 in the centrally positioned conduit 218 and is conveyed into collectors 166 and 168 ready for use. Simultaneously the fluids which cannot permeate the membrane 216, e.g., water vapor and oxygen, pass about the membranes 216 and through the conduits 220 into the separators 170 and 172.

These concurrent operations, which represent the full cylce of operation, will continue until the gas detector 160 for the tubes 18b, d, f and h indicates that hydrogen is no longer being produced in such tubes in meaningful quantities because of deactivation of the catalyst 20 therein. At this juncture the other gas detector 158 operatively connected to the other tubes 18a, c, e and g will show meaningful quantities of hydrogen being passed through the conduit 154 which indicates that the catalyst 20 in such tubes has been reactivated, ready once again to produce hydrogen. The opening and closing of the valves is reversed so that steam is supplied through valve 136 to the tubes 18a, c, e and g as hydrogen is supplied through valve 142 to the tubes 18b, d, f and h, thereby reversing the reactions in each set of four tubes.

Thus, by the practice of the present invention, hydrogen is continuously produced ready for use upon demand, where needed, as needed.

As an illustrative example of the hydrogen generating system 10 shown in FIGS. 1-2 and 9-14, the reactor 12 is about 15 inches in length and 6.15 inches in diameter, while the centrally positioned boiler 14 is about 10 inches in diameter. Typically, the reactor tubes 18a-h, which also are about 15 inches in length, are about 0.875 in diameter.

As shown, the water quencher 152 is about 5.0 inches in length and about 10 inches in diameter, and the inner tube 202 has a diameter of about 3.125 inches. Within the quencher 152 the manifold 190 has a length of about 4.0 inches, and an outer diameter of about 6.5 inches.

Further in the illustrative embodiment of FIG. 14, a metering device 221 at the upstream ends of each of the tubes 18a-h is provided which controls the flow of steam and hydrogen thereinto.

In the embodiment where the catalyst becomes deactivated and is regenerated as just described, moreover, a foametal catalyst of iron is used. Where the foametal catalyst of iron is wound in a spiral sheet 46 as shown in FIG. 5, its length can be about 2.0 inches and its diameter can be from about 0.5 to 0.625 inches. Where the foametal catalyst of iron is the form of a series of juxtaposed discs as shown in FIG. 6, each disc can be about 0.125 in thickness and the combined length of the juxtaposed discs also can be about 2.0 inches in length.

Whether the catalyst 20 is in the form of a sheet or discs, the temperature of the steam in the reactor is raised to about 1000° F.-1800° F., at which temperature, and with such catalysts, the steam disassociates and hydrogen is generated.

In the practice of the invention the required quantities of fuel for the burner 44 and the regenerating agent for the deactivated catalysts are substantially less than the hydrogen generated, resulting in an efficient system.

As will be described in the next several embodiments, platinum type catalysts, which normally do not need regeneration, can be used to achieve even greater efficiencies.

FIGS. 15-18

Referring generally to this and other embodiments of the invention hereinafter described, like reference numbers refer to like parts of the system which have been already described.

In the embodiment shown in FIGS. 15-18, steam is fed from the steam generator 14 into the downstream end of the reactor 12 wherein the steam flows in a serpentine path through interconnected tubes 18a–h containing platinum type catalyst systems 20.

Figure 15:
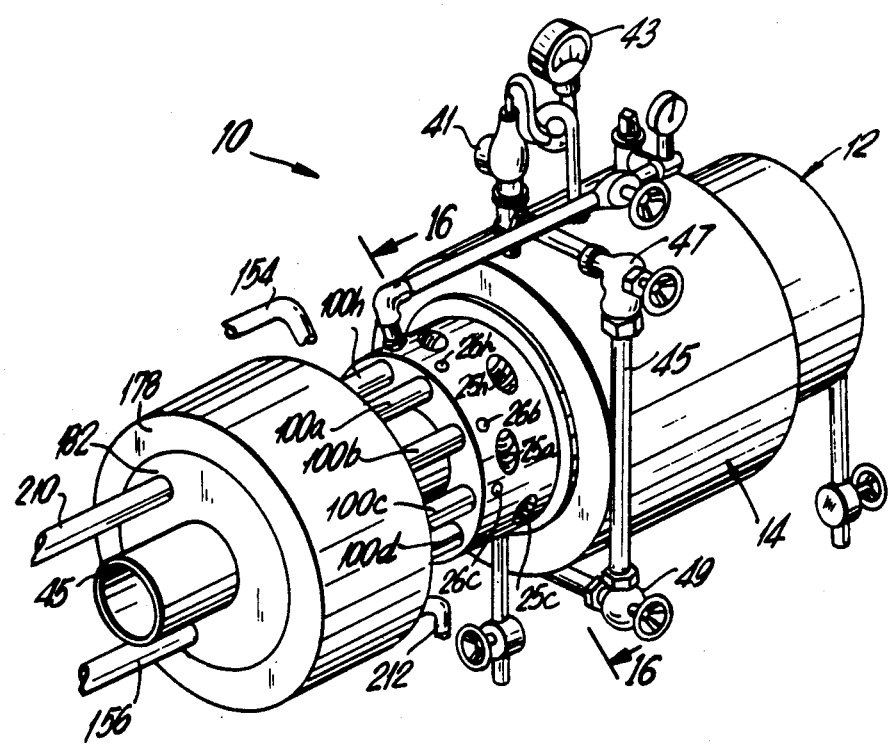
FIG. 15 is a perspective view of another embodiment of a hydrogen generating system of the present invention.

As shown in FIG. 15, steam is conveyed to the downstream radial bore 28h of the reactor 12 by the steam conduit which includes a valve 222 and pressure gauge 224 that monitors and controls the pressure and flow of steam therethrough.

Figure 16:
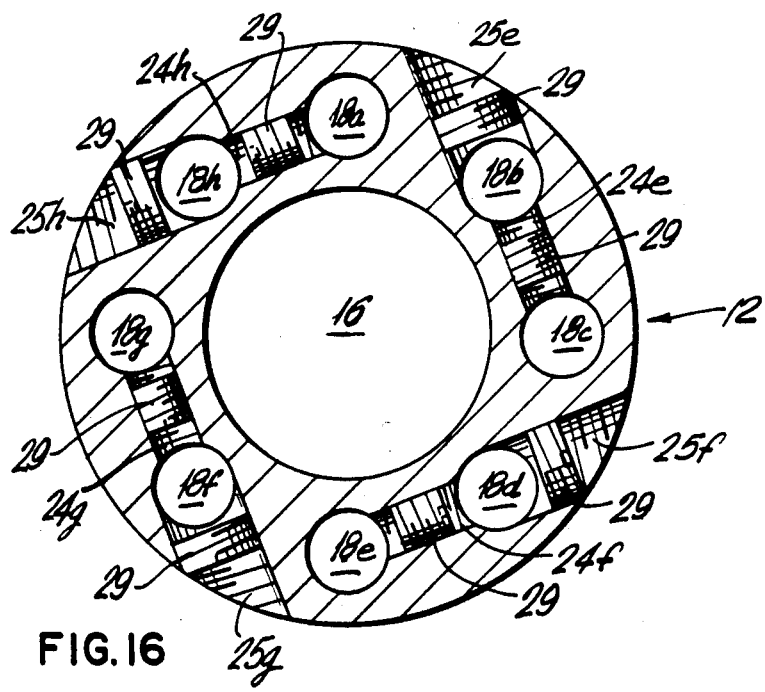
FIG. 16 is a cross-sectional view of the reactor of FIG. 15, taken along the lines 16—16, wherein a second set of transverse passages are shown for interconnection of the illustrated reactor tubes.

To provide the serpentine path for the flow of steam within the reactor 12, a second set of transverse bores 24e–h in the downstream portion of the reactor 12 connect alternate pairs of longitudinal reactor tubes, i.e., 18b–c, 18d–e, 18f–g and 18h–a (See FIG. 16).

Taken together the most downstream transverse bore 24a–d, shown in detail in FIG. 4, connect the longitudinal tubes 18a–h in pairs: 18a–b, 18c–d, 18e–f and 18g–h while the next downstream transverse bores 24e–h, shown in detail in FIG. 16, connect the longitudinal bores 18a–h in pairs: 18b–c, 18d–e, 18f–g and 18h–a.

As with their counterparts, transverse bores 24e–h also are threaded and are connected to threaded, transverse access bores 25e–h. In each of these bores, moreover, removable plugs 29 are provided.

In this embodiment platinum type catalyst systems 20, such as illustrated in FIGS. 8-10, can be used.

As has been previously explained with a platinum type catalyst, deactivation normally does not occur and regeneration is, therefore, not required. Accordingly, feeding steam and a regenerating agent to a particular tube 18 or set of tubes 18, on an alternating basis, is not needed. Also, downstream of reactor 12, the quencher manifold 190 need only have one cooling chamber 194 and there need be only one separator 162 downstream thereof. In addition, a downstream gas detector, such as detectors 158 and 160, shown in FIG. 1, becomes optional because hydrogen will be generated on a continuous basis within the platinum type, catalyst containing reactor tubes 18a–h.

Figure 17:
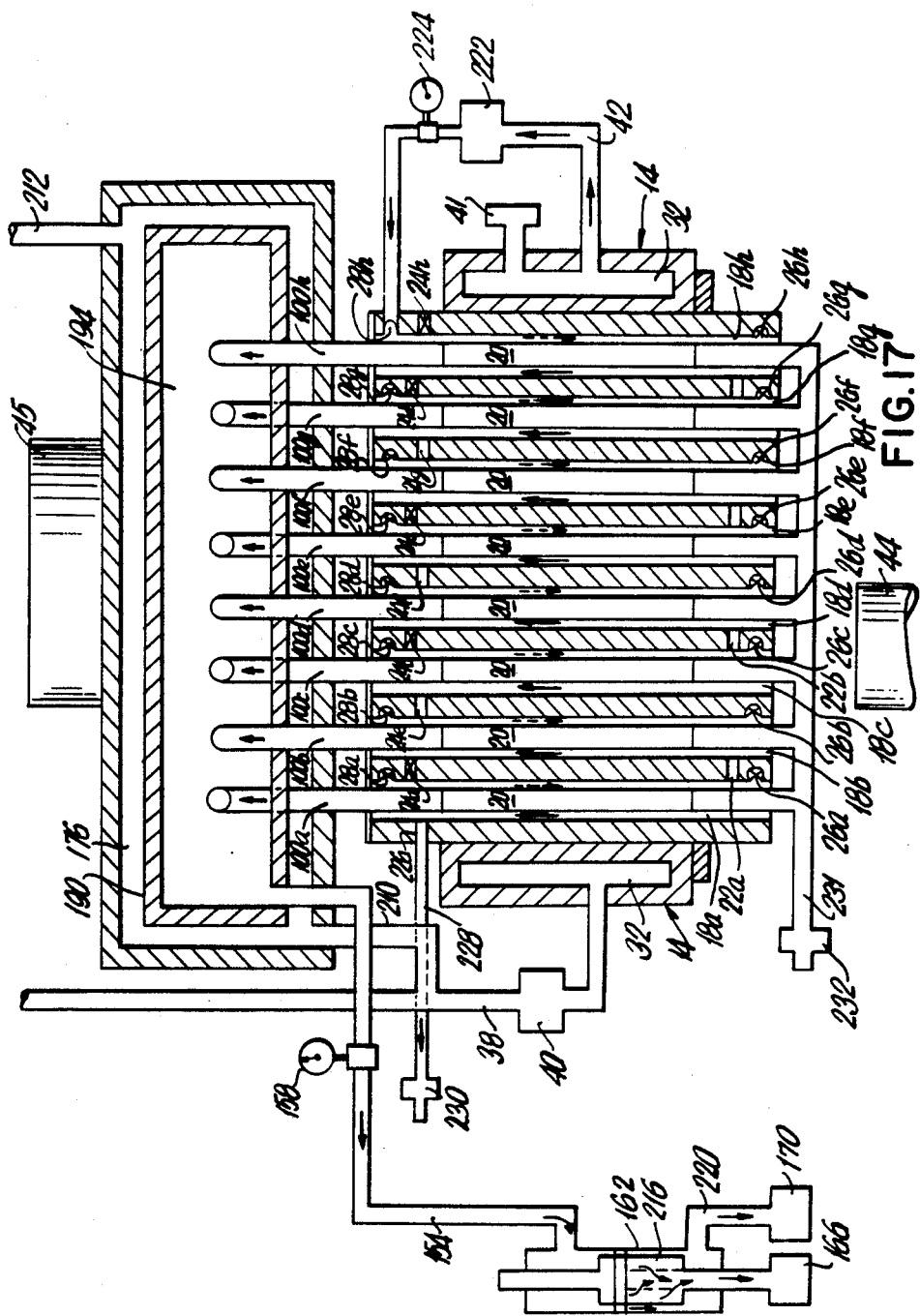
FIG. 17 is a planar view, diagrammatically illustrating the interrelationship between the components and operation of the system shown in FIG. 15.

As shown in FIG. 17 radial bore 26h has been opened by removing the plug 29 therein and is connected to the steam conduit 42 in a fluid tight relationship. At the same time the transverse bores 24e–g and bores 22a–d are opened by removing plugs 29 while the remaining bores (transverse bores 24a–d 24h and radial bores 26a–h and 28a–g) are closed.

In operation the burner 44, or other source of heat, effects the generation of steam within the boiler 14 and the steam is fed from the boiler 14 to the reactor tubes 18a–h through the conduit 42 under a control led rate of flow and pressure, e.g., 3 p.s.i.g. The flow rate and pressure is sufficient for passage of steam through the interconnected tubes 18a–h and for disassociation of steam to hydrogen.

From the conduit 42 the steam initially flows through the radial bore 26h and into the adjacent end of the reactor tube 18h. The steam within the tube 18h is raised to disassociation temperatures of about 1000° F. to 1800° F. by the burner 44 and with the platinum type catalyst system 20 effects disassociation. As previously explained, only hydrogen is allowed to diffuse through the platinum type catalyst 20 and into the catalyst conduit 62 for flow from the reactor 12 through conduit 100h into the water quencher 152. At the same time the steam, which has not disassociated and the oxygen from the disassociated steam, flows about the catalyst 20 to the other end of the reactor 12 and through the transverse bore 22d and into the reactor tube 18g where the process is again repeated. As shown by the arrows indicating the flow of steam, any remaining steam and disassociated oxygen moves in a serpentine path through the remaining tubes 18f–18a and transverse bores 22c–a and 24g–e for further disassociation. The diffused hydrogen in the conduits 62 and in the tubes 18a–h flows as indicated from the reactor 12 through the conduits 100a–h into the quencher chamber 194. At the same time residual steam and disassociated oxygen in the last tube 18a are conveyed from the downstream end of the reactor 12 through reactor bore 226 into a conduit 228 connected thereinto in a fluid type relationship. A valve 230 in the conduit 228 regulates the flow therethrough by throttling, to control, by back pressure, the pressure of the fluids within the reactor tubes 18a–h and optimize the generation of hydrogen therein.

As illustrated, each of the conduits 62 of the catalyst systems 20 also can be connected at their other ends, in a fluid type relationship, with a manifold 231 which includes control valve 232. In use, this control valve 232 can be opened and closed to provide a positive or negative pressure, as desired, for urging hydrogen gas in the catalyst conduits 62 into the quencher 152 or for exhausting gases from the catalyst conduits 62 through the manifold 231.

In addition, downstream of the quencher 152 the cooled hydrogen gas can be fed into and through the previously described separator 162 to further ensure the separation of hydrogen from any residual fluids which may have diffused through the platinum type catalyst along with the hydrogen.

FIGS. 18-20

Figure 18:
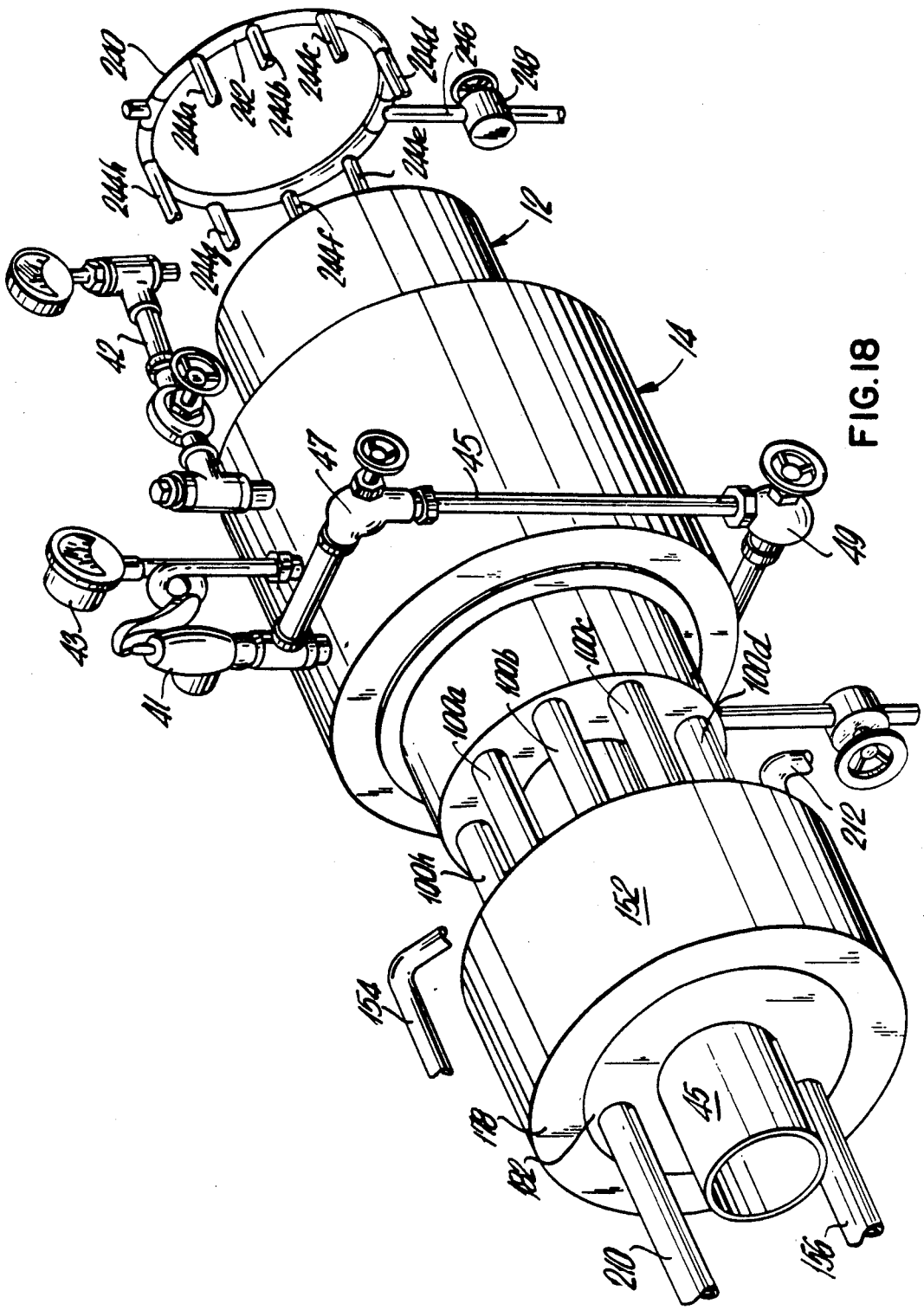
FIG. 18 is a perspective view of a further embodiment of the hydrogen generating system of the present invention.
Figure 19:
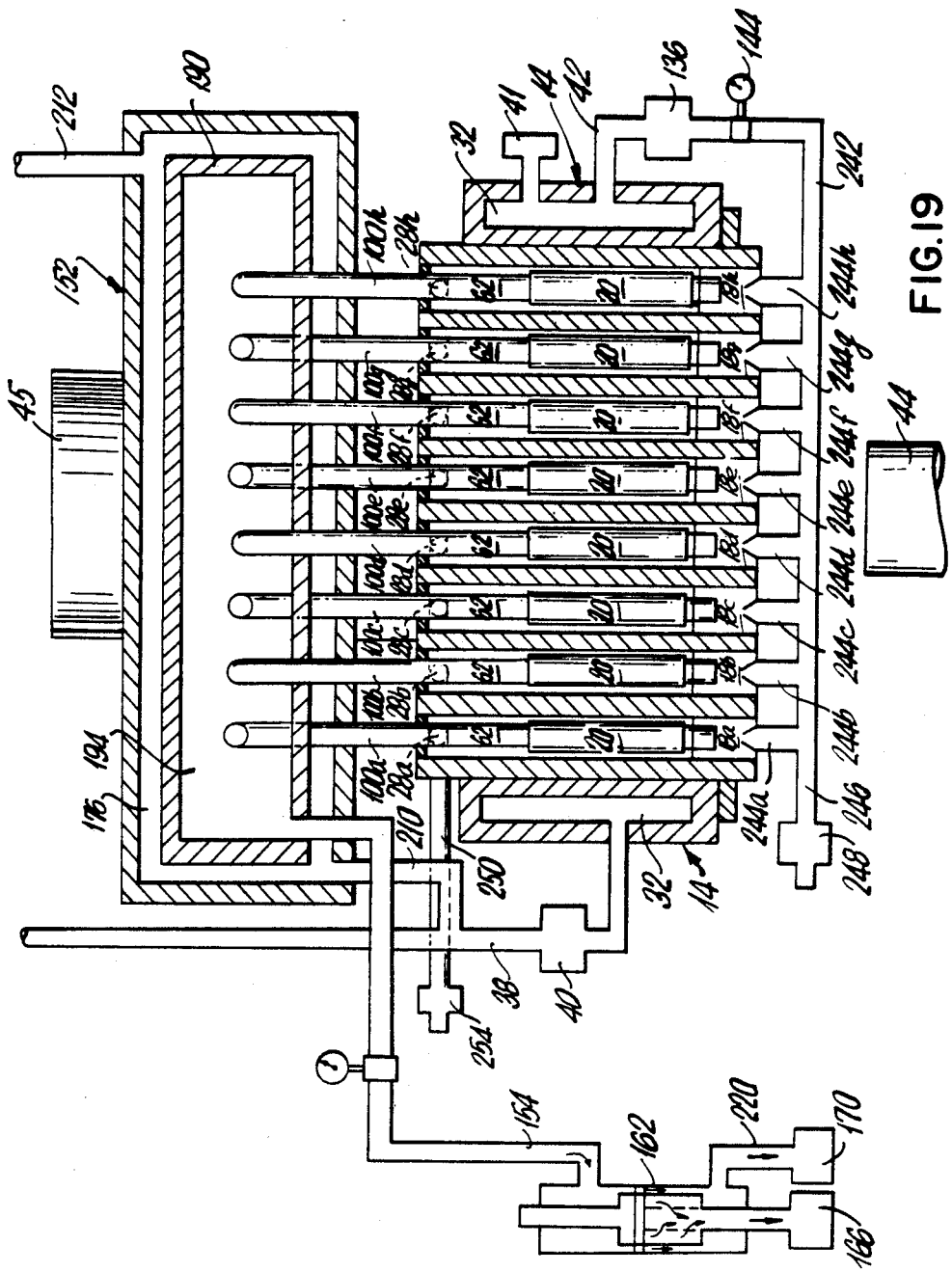
FIG. 19 is a planar view, diagrammatically illustrating the interrelationship between the components and operation of the system shown in FIG. 18 wherein the steam is fed into the catalyst in each of the reactor tubes.
Figure 20:
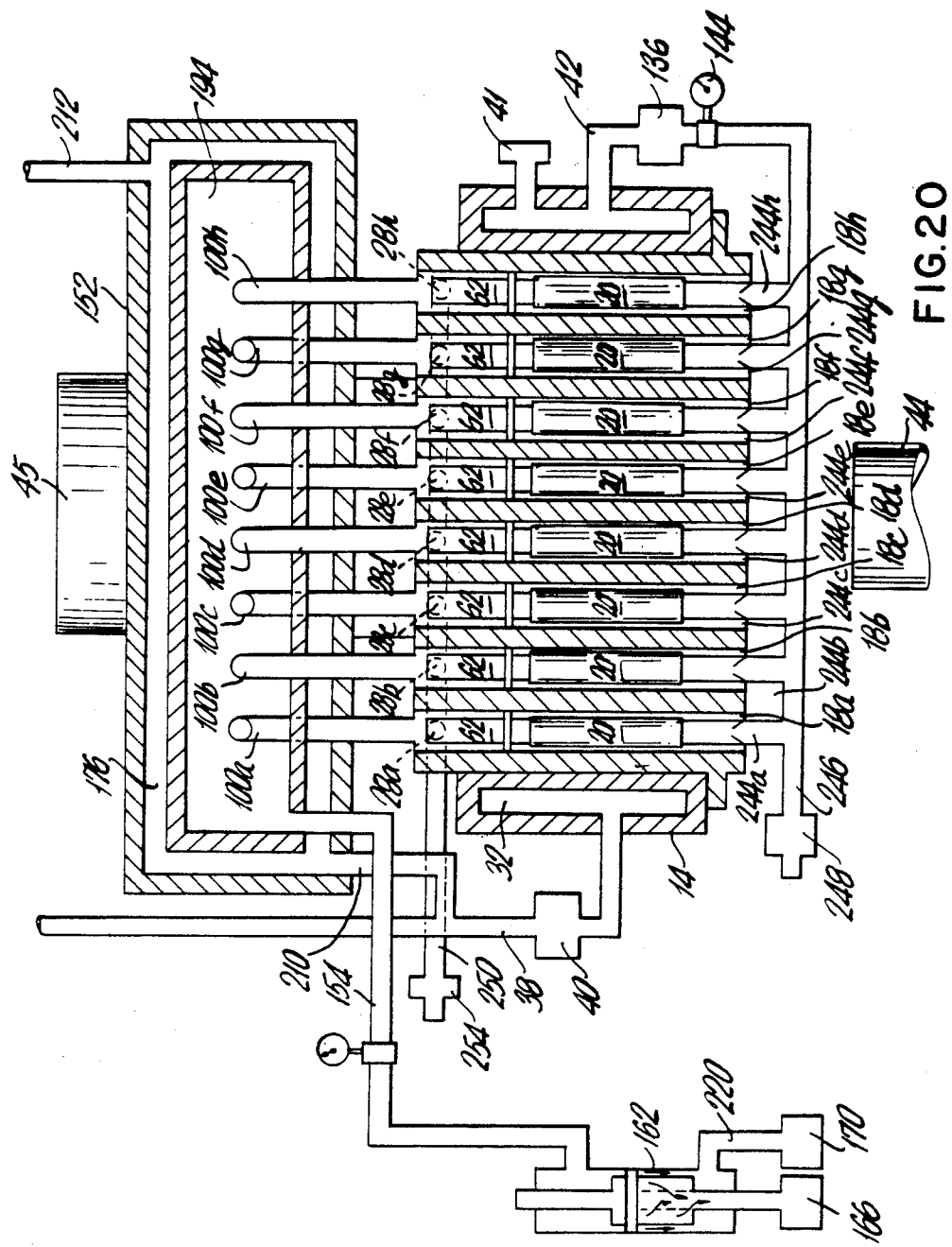
FIG. 20 is a planar view also diagrammatically illustrating the interrelationship between the components and operation of the system as shown in FIG. 18 wherein the steam is fed about the catalyst in each of the reactor tubes.

In FIG. 18 there is shown an embodiment of the invention with a single upstream manifold 240 that provides steam to the tubes 18a–h for generation of hydrogen with either of the platinum type catalyst systems 20 shown in FIGS. 19 and 20.

Referring to FIG. 18, the system includes the previously described hydrogen generating reactor 12, steam generator 14, downstream conduits 100a–h and quencher 152. The steam is conveyed from the generator 14 by the conduit 42 to the top of the single upstream manifold 240 which includes a circular conduit 242 and eight inwardly extending conduits 244a–h threadably and removably connected to the reactor tubes 18a–h, as has been described and illustrated for the dual manifolds 96-98 (see FIG. 11). From the bottom of the circular conduit 242, a conduit 246 and valve 248 are provided for drainage or for conveying gases or liquids from a source (not shown) to the reactor 12.

As shown in FIG. 19 the steam from the conduits 244a–h flows into the upstream portion of the tubes 18a–h and about the platinum type catalyst systems 20. At the elevated temperatures and pressures previously described, and in the presence of the platinum type catalyst systems 20, the steam disassociates into hydrogen and oxygen gases with the hydrogen diffusing through the catalyst into the conduit 62. Simultaneously, oxygen and residual steam flows into the downstream portion of the tubes 18a–h where they are removed via a manifold 250 having conduits connected into the downstream radial bores 28a–h in a fluid tight relationship. A valve 254 in the manifold 250 is provided to control flow and pressure in the manifold 250 and tubes 18a–h. By controlling the opening in the manifold 250 the pressure of the fluids in the tubes 18a–h can be increased or decreased for optimizing disassociation and diffusion of hydrogen through the platinum type catalyst systems 20.

Concurrent with removing oxygen and residual steam from the tubes 18a–h, the hydrogen gas is conveyed from the reactor 12, through conduits 100a–h and into quencher chamber 94. The cooled hydrogen gas is fed into conduit 154 and, if desired, into and through the separator 162.

In the embodiment of the invention schematically shown in FIG. 20, the steam from conduit 42 is fed into the conduits 62 of the catalyst system 20, wherein the hydrogen diffuses outwardly into the tubes 18a–h while the disassociated oxygen and residual steam flows through closed ended conduits 62 into the downstream manifold 250 through interconnecting radial passageways 28a–h. In this instance, the diffused hydrogen flows about the catalyst systems 20 downstream and into the conduits 100a–h for quenching and separation, if desired, ready for use upon demand.

In the following embodiments of the invention, we describe illustrative overall systems which incorporate the hydrogen generating systems. These overall systems include boilers, gas turbines, internal combustion engines, wankel engines, stirling engines and hydrogen cells.

THE ENERGY SYSTEM IN A BOILER

Figure 21:
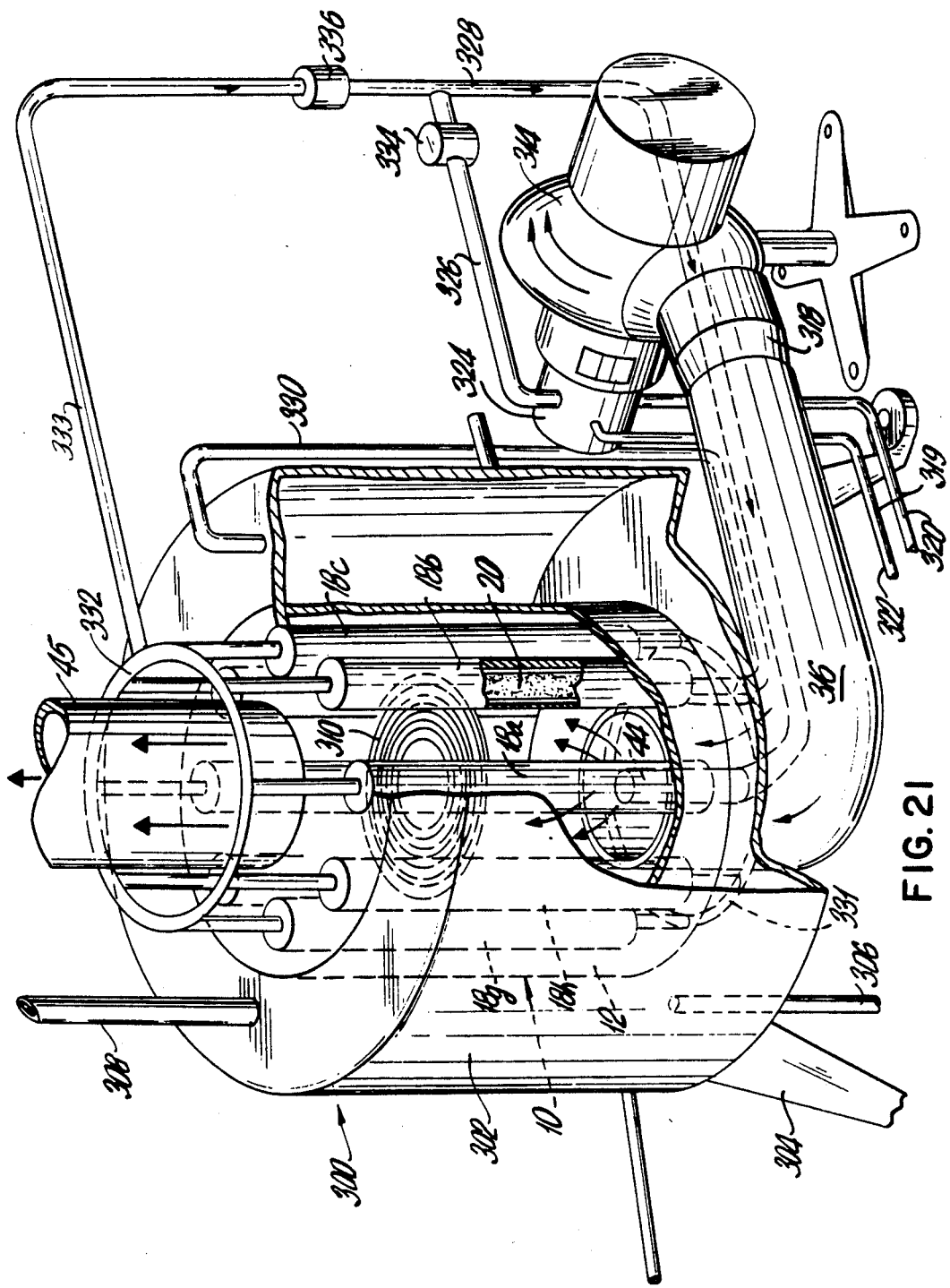
FIG. 21 is a perspective view, partially broken away, showing the energy system producing hydrogen fuel for a boiler.

Referring first to FIG. 21, there is shown a boiler 300 within which the energy system 10 of the invention is positioned.

The boiler 300 includes an upright cylindrical tank 302 on supporting legs 304. Water is supplied to the bottom of the tank 302 by an inlet conduit 306, and steam for heating and working purposes is conveyed from the tank 302 from the outlet conduit 308 extending from the top thereof.

Centrally positioned within the tank 302 is the reactor 12, in an upright position, with vertical tubes 18a–h and catalyst systems 20 about a vertical heat generating chamber 16. Extending into the chamber 16 is the burner 44 providing an air-fuel mixture to the lower portion thereof. As shown, the catalyst systems 20 are in the lower portions of the tubes 18a–h and the burning air-fuel mixture from the burner 44 impinges on said portion. To minimize heat loss a baffle 310 is centrally positioned within the chamber 16 above the burning air-fuel mixture. In the illustrative embodiment the baffle 310 is a spiral wound coil with its outer periphery secured to the outer wall 312 of the chamber 16. Any residual heat that does escape is exhausted from the chamber 16 through the exhaust pipe 45.

Compressed air for the burner nozzle 44 is provided in this embodiment by a motor driven centrifugal blower 314 having a duct 316 extending from the blower outlet 318 into the chamber 16. Fuel for the burner nozzle 44 is supplied by the generated hydrogen as hereafter described and by fuel lines 319 having a supply and return conduits 320 and 322 connected to a fuel pump 324, and a conduit 326 connected to a common fuel-hydrogen conduit 328. The common conduit 328 extends through the duct 316 to the burner 44 centrally positioned at the outlet of the duct 316 in the lower portion of the chamber 16.

Steam for the reactor 12 is conveyed through a conduit 330 connected to the top of the tank and to the upstream side of the tubes 18a–h via a manifold 331 which, in this embodiment, is in the lower portion of the reactor 12. Hydrogen generated by the reactor 12 is conveyed from the top and downstream end of the reactor tubes 18a–h to and through a manifold and a conduit 33 which, in turn, is connected to the common conduit 328.

Control means, check valves 334 and 336, are connected into the fuel and hydrogen conduit 326 and 333 to control the flow of fuels to the burner 44.

During start up, the hydrogen check valve 336 is closed and the fuel check valve 334 is open. The fuel at the burner 44 is ignited, and with the compressed air supplied by the blower 314 throughout the operation, burns to provide heat for the generation of steam in the tank 302.

When the temperature of the water in the tank 302 has been raised and steam is being generated, it is simultaneously conveyed from the tank 302 by conduit 308 for heating and working purposes, and by conduit 330 for generating hydrogen. The steam in conduit 330 is fed into the lower (upstream) portion of selected reactor tubes 18, as previously described, wherein the steam at the super heated temperatures reacts with the catalyst 20 to produce hydrogen.

The generated hydrogen is then conveyed through the upper (downstream) end of the reactor 12. At this juncture the hydrogen check valve 336 is opened and the fuel check valve 334 can be partially or entirely closed so that hydrogen, with or without fuel, is conveyed to the burner 44 via the common conduit 328.

When on stream, therefore, the generated hydrogen is the fuel source for the heat that produces steam in the tank 302 and hydrogen in the reactor 12.

THE ENERGY SYSTEM IN A GAS TURBINE

Figure 22:
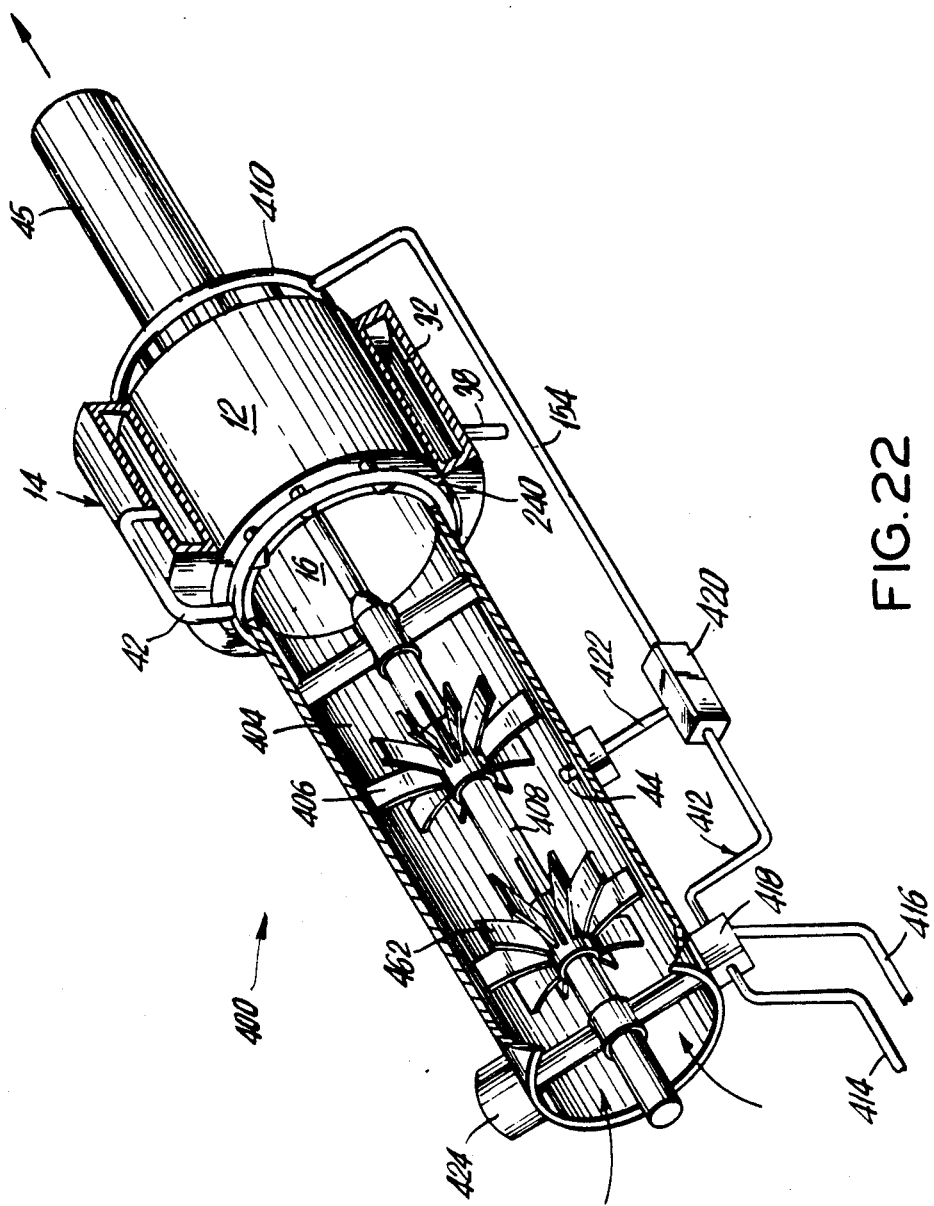
FIG. 22 is a perspective view, partially broken away, showing the energy system of the invention for producing hydrogen fuel for a turbine.

In FIG. 22, there is shown the energy system 10 of the invention producing hydrogen fuel for operating a gas turbine 400.

The gas turbine 400 includes an air compressor 402, a combustion chamber 404, and a turbine wheel 406 within the chamber 404, wherein the compressed air and fuel form a combustible mixture which drives the turbine wheel 406.

The compressor 402 and turbine 406 are mounted on a common shaft 408 which extends from the gas turbine 400 and which, when rotated by the turbine wheel 406, generates mechanical power useful in generating electricity.

Extending downstream from and connected to the combustion chamber 404 is the reactor 12 with its central heating chamber 16 for receiving the hot exhaust gases of combustion before they are exhausted downstream through exhaust pipe 45. About the reactor 12 is the boiler 14 with its conduit 38 for supplying water and with its conduit 42 for supplying steam to the reactor 12 through an upstream manifold 240.

Prior to the generation of hydrogen within the reactor 12, fuel is supplied to the combustion chamber 404 from a fuel line 412 having fuel supply and return conduits 414 and 416 connected to a fuel pump 418. Downstream of the pump 418 the fuel line 412 is connected to a hydrogen-fuel mixer 420 from which a conduit 422 extends to the burner 44 in the chamber 404.

Initially a conventional starter motor 424 rotates the shaft 408 so that air is sucked in and compressed by the rotating compressor 402 and conveyed into the combustion chamber 404. At the same time fuel is supplied by the line 412 to the burner 44 and ignited. The compressed air and ignited fuel mixture burns and rotates the turbine wheel 406 to drive the shaft 408, independent of the starter motor 424, for providing the desired mechanical power.

Once the turbine 400 is on stream, the gases of combustion reach temperatures within the reactor 12 to generate steam in the boiler 14 and hydrogen fuel from steam in the reactor tubes 18$a$-$h$, as previously described. Within the tubes 18$a$-$h$ the steam is elevated to disassociation temperatures in the presence of a previously described catalyst system to produce hydrogen fuel which is conveyed from a downstream manifold 410 and conduit 154 to the hydrogen-fuel mixer 420. With the supply of hydrogen from the reactor 12, the amount of fuel needed from the fuel line 412 is reduced or cut off by the mixer 420 and is conveyed back to the return fuel conduit 416. Accordingly, the generated hydrogen, with or without fuel from line 412, is delivered to the burner 44 from the mixer 420 by conduit 422 to provide the combustible mixture for the combustion chamber 404.

THE ENERGY SYSTEM FOR A FOUR CYCLE INTERNAL COMBUSTION ENGINE

Figure 23:
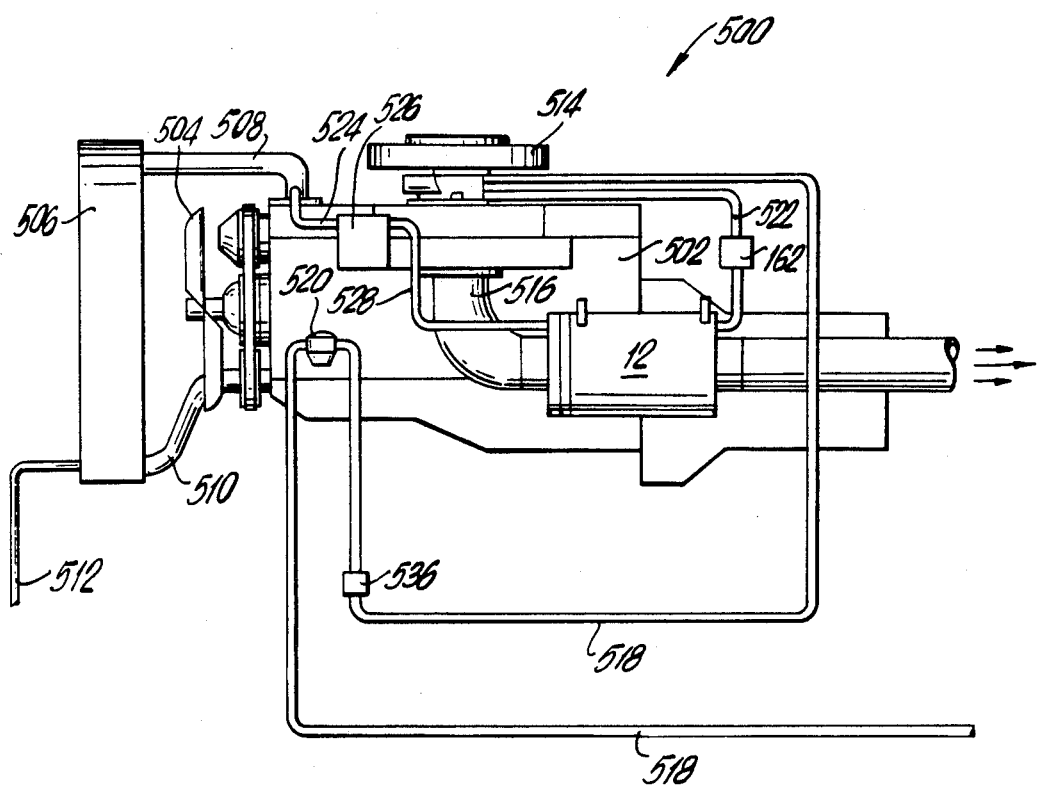
FIG. 23 is a side view showing the system of the invention producing hydrogen fuel for a four cycle internal combustion engine.

In FIG. 23, there is shown the energy system 10 being used to produce hydrogen fuel for the four cycle piston driven internal combustion engine 500 for land and marine vehicles, such as automobiles, trucks, farm equipment and boats.

The engine 500 is of the conventional type and includes an engine block 502 having cylinders and pistons, not shown, and a fan 504 for an air cooled radiator 506 having conduits 508 and 510 for conveying water to and from the engine block 502, and a conduit 512 for providing water to the radiator 506 as needed. As in conventional internal combustion engines, there also is a carburetor 514 within which the air-fuel mixture is formed for driving the pistons, and a manifold 516 for exhausting the hot gases of combustion.

Initially fossil fuel, e.g., gasoline, is provided to start and drive the engine 500 until it is at normal operating temperatures which raises the water to temperatures of about 180° F. to 200° F. The fuel is supplied to the carburetor 514 by a fuel line 518 and a fuel pump 520.

Once operating temperatures have been reached, hydrogen is generated by the system 10 and is used as a fuel for driving the engine 500. For this purpose the system 10 includes the reactor 12 through which the exhaust manifold 516 extends to provide heat for the production of hydrogen, and from which conduit 522 extends to provide generated hydrogen to the carburetor 514.

To provide steam for generating hydrogen, an interconnecting conduit 524 extends from the hot water conduit 508 to a flasher 526 connected to the manifold 516. In operation, the heat from the exhaust manifold 516 generates steam in the flasher 526, and the steam is conveyed from the flasher 526 to the reactor 12 by conduit 528.

Within the reactor 12 hydrogen is generated from the steam provided by conduit 528. The generated hydrogen is then conveyed to the carburetor 514 via conduit 522. To insure that only hydrogen reaches the carburetor 514 there is provided a separator 162 in the conduit 522 which, as previously described, allows only hydrogen to pass therethrough.

When hydrogen is being delivered to the carburetor 514, a valve 536 in the fuel line 518 can cut off or decrease the supply of fossil fuel, as desired.

Thus, in this embodiment, fossil fuels initially drive the engine until the engine reaches operating temperatures when hydrogen from the reactor 12 can be used to drive the engine 500.

THE ENERGY SYSTEM FOR A ROTARY INTERNAL COMBUSTION ENGINE

Figure 24:
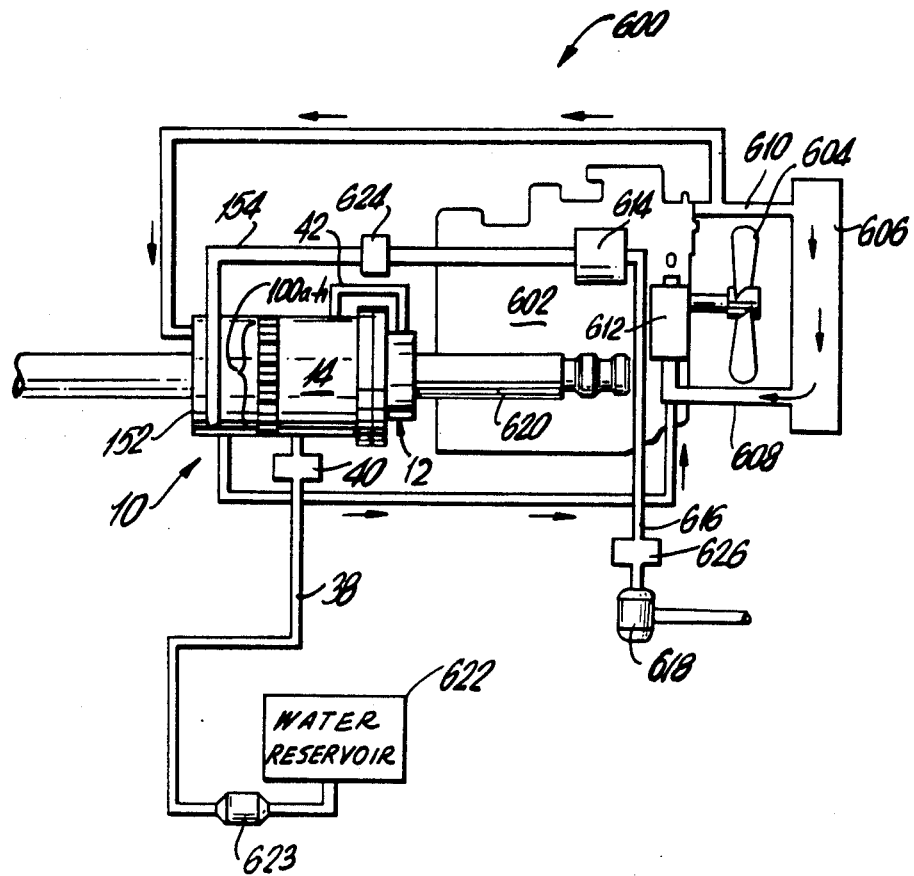
FIG. 24 is a side view showing the system of the invention producing hydrogen fuel for the Wankel engine.

In FIG. 24 there is shown an energy sytem 10 of the invention which produces hydrogen fuel for driving a Felix Wankel rotary internal combustion engine for vehicles, boats, etc.

The engine 600 is of a conventional type, and includes a block 602 for the rotor and combustion chamber, not shown, a fan 604 for an air cooled radiator 606 having conduits 608 and 610 for conveying water to and from the block 602, a water pump 612 in the conduit 608 for circulating the water, a carburetor 614 within which the air-fuel mixture is formed for driving the rotor, a fuel line 616 with a fuel pump 618 therein for providing fossil fuel to the carburetor 614, and a manifold 620 for exhausting the hot gases of combustion.

About the manifold 620 is the hydrogen generating system 10 which includes the reactor 12, the steam generator 14, the conduit 38 and valve 40 for providing water to the steam generator 14, the conduit 42 for conveying steam from the generator to the reactor 12, the water quencher 152 for cooling the hydrogen generated within the reactor 12 and conveyed thereto by the conduits 100$a$-$h$, and the conduit 154 for conveying the cooled hydrogen to the carburetor 614 for driving the rotor of the engine 600.

In this embodiment the water for the system 10 is delivered from a reservoir 622 by pump 623 connected to the conduit 38.

In operation, fossil fuel initially is provided to the carburetor 612 via the fuel line 616 and fuel pump 618 for driving the rotor of the engine 600. When the engine reaches operating temperatures the valve 40 is opened, and the exhaust gases flowing through the manifold 620 and through the system 10 are sufficient to generate steam within generator 14 from the water supplied therein and to generate hydrogen within the reactor 12 in the presence of previously described catalyst system. From the reactor 12 the generated hydrogen is conveyed via conduits 100$a$-$h$ into the water quencher 152 where the hydrogen is collected and cooled and delivered to the conduit 154. At this time the generated hydrogen can be used to drive the rotary engine 600 with or without fossil fuel. To effect the transition, the control valves 624 and 626 in lines 154 and 616, respectively, are regulated to provide the desired quantities of hydrogen and fossil fuels.

Here again, fossil fuels initially are used to drive the engine 600 until hydrogen is generated within the reactor 12.

THE ENERGY SYSTEM FOR A STIRLING ENGINE

In general, Stirling engines utilize a working gas, such as hydrogen or helium, in a closed system to drive pistons connected to the drive shaft of the engine. The working gas moves continuously back and forth between the hot space above the piston in one cylinder and the cold space beneath the piston in the next cylinder. Between these two spaces the gas passes through a heater which heats the gas, a regenerator which stores and gives off heat from the gas, and a cooler which cools the gas.

Figure 25:
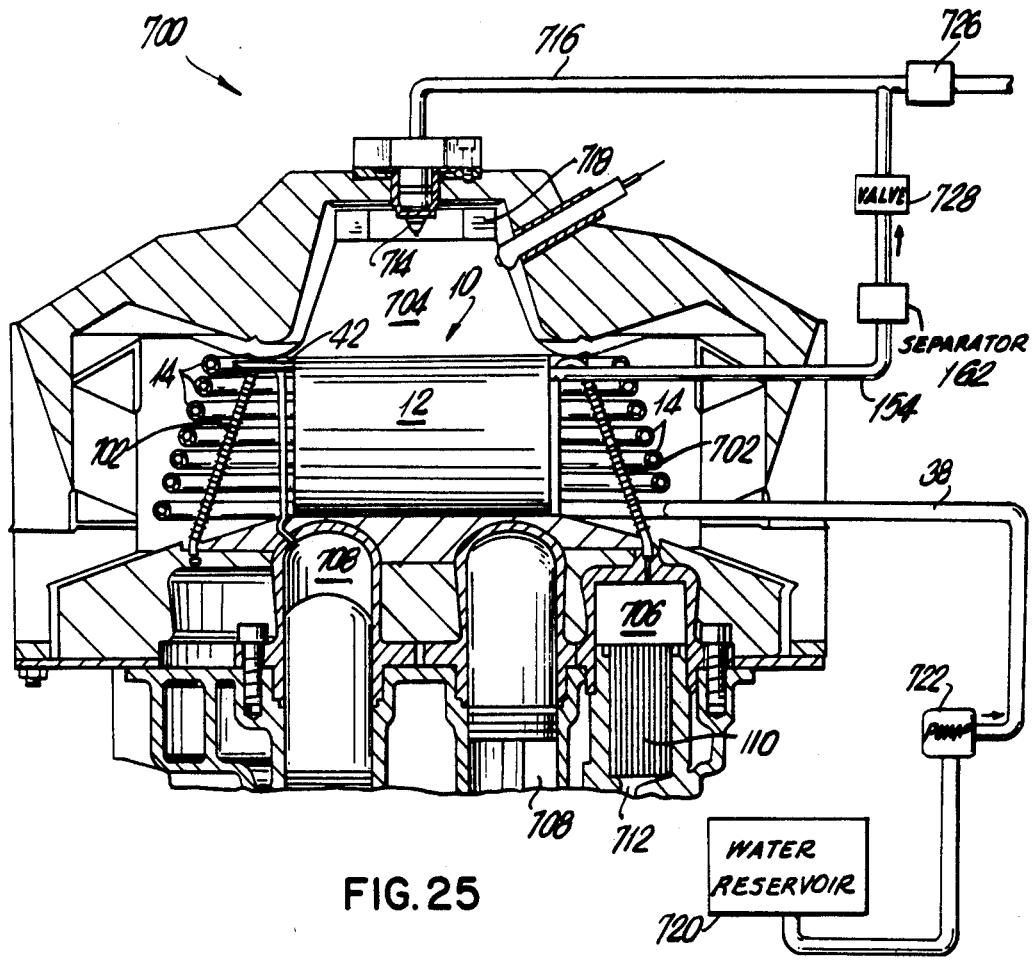
FIG. 25 is a front view, partially broken away, of a Stirling cycle engine which includes the hydrogen generating system.

As shown in FIG. 25, the Stirling engine 700 includes heaters 702 which are positioned in the upper chamber 704 and which are connected between the regenerator 706 and upper side of the cylinders 708. Below the regenerators 706 are coolers 710 which are connected to the opposite side of the cylinders 708 via passageways 712 (only partially shown).

The heat for the heater 702 is provided by the combustion of an air-fuel mixture in the upper portion of the chamber 704. Fuel is supplied by a fuel injector 714 connected to a fuel line 716, and air is supplied through a turbulator 718 which provides flow patterns suitable for combustion. The hot exhaust gases from the combustion of the air-fuel mixture pass about the heater 702 so that heat is transferred to the interior working gas. This illustrative Stirling engine is described in greater detail in a brochure published by United Stirling (Sweden) AB&CO.

The system 10 for the engine 700 is positioned within the upper chamber 704 of the engine 700, and includes the steam generator 14 in the form of a coil and the reactor 12 positioned within the generator 14. Water is supplied to the steam generating coil 14 from a water reservoir 720 by a pump 722 through the conduit 38 connected therebetween.

Figure 26:
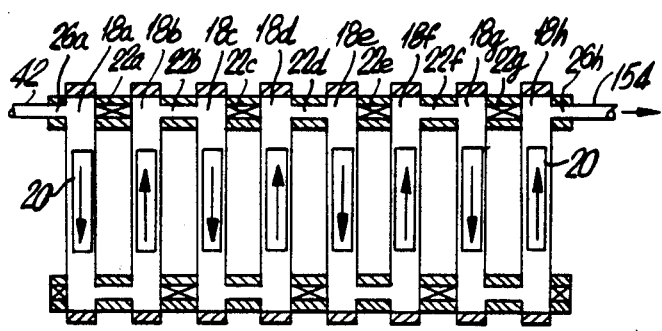
FIG. 26 is a planar view, diagrammatically illustrating the reactor of the present invention for the Stirling cycle engine shown in FIG. 25.

As schematically shown in FIG. 26, the reactor 12 is in the upright position and includes vertical reactor tubes 18a–h. This embodiment there are seven transverse bores at opposite ends of the tubes 18a–h (transverse bores 22a–g and 24a–g) for interconnecting the tubes 18a–h. As illustrated upper transverse bores 22a, c, e and g and lower transverse bores 24b, d and f are closed while the other transverse bores (upper transverse bores 22b, d and f and lower transverse bores 24a, c, e and g) are opened. With this configuration, steam provided through interconnecting conduit 42 and radial bore 26a flows through the reactor tubes 18a–h, and in the presence of the catalyst systems 20, in a serpentine path. The generated hydrogen and other fluids from the reactor 12 are conveyed therefrom through radial bore 26h and conduit 154 to the separator 162, which, as previously described, separates the generated hydrogen from the other fluids. As now will be explained, this hydrogen can be used as the fuel for combustion in the chamber 704.

Initially the valve 726 in the fuel line 716 is opened and the valve 728 in the conduit 154 is closed. Accordingly, fuel, such as fossil fuel or other stored fuel, is provided from a source, not shown, to the fuel injector 714. The heat from the products of combustion within the upper chamber 704 concurrently heats the working gas in the heaters 702 as well as the water in the steam generator 14 and the steam in the reactor 12 by passing therearound and therethrough the generator 14 and reactor 12. The hydrogen and other fluids generated in the reactor 12 flow through the conduit 154 to the separator 162 where only hydrogen is allowed to flow downstream. When the hydrogen fuel has reached appropriate levels, the valve 728 in the conduit 154 is opened and the valve 726 in the fuel line 716 can be closed or throttled. In the event that the valve 726 is closed, then only generated hydrogen will be supplied to the fuel injector 714 as the fuel for the combustible mixture. In the event that the valve 726 in the fuel line 716 is only throttled, then the hydrogen and the other fuel will be mixed and supplied to the fuel injector 714 as the fuel for the combustible mixture.

Consequently, in this embodiment the heat for the working gas for the engine 700 is used to generate hydrogen which can be used as fuel for the combustible mixture once the engine is at operating temperatures.

HYDROGEN GENERATING SYSTEM FOR FUEL CELLS

In a fuel cell electricity is generated by a chemical reaction in which the reactants are continuously fed to the cell as the reaction proceeds. One reactant is a fuel, such as hydrogen, and the other reactant is an oxidant, such as air or oxygen. So long as the reactants, hydrogen and oxidant, are fed into the cell and the reaction product, water, is removed from the cell, the fuel cell generates power in the form of direct current electricity.

Figure 27:
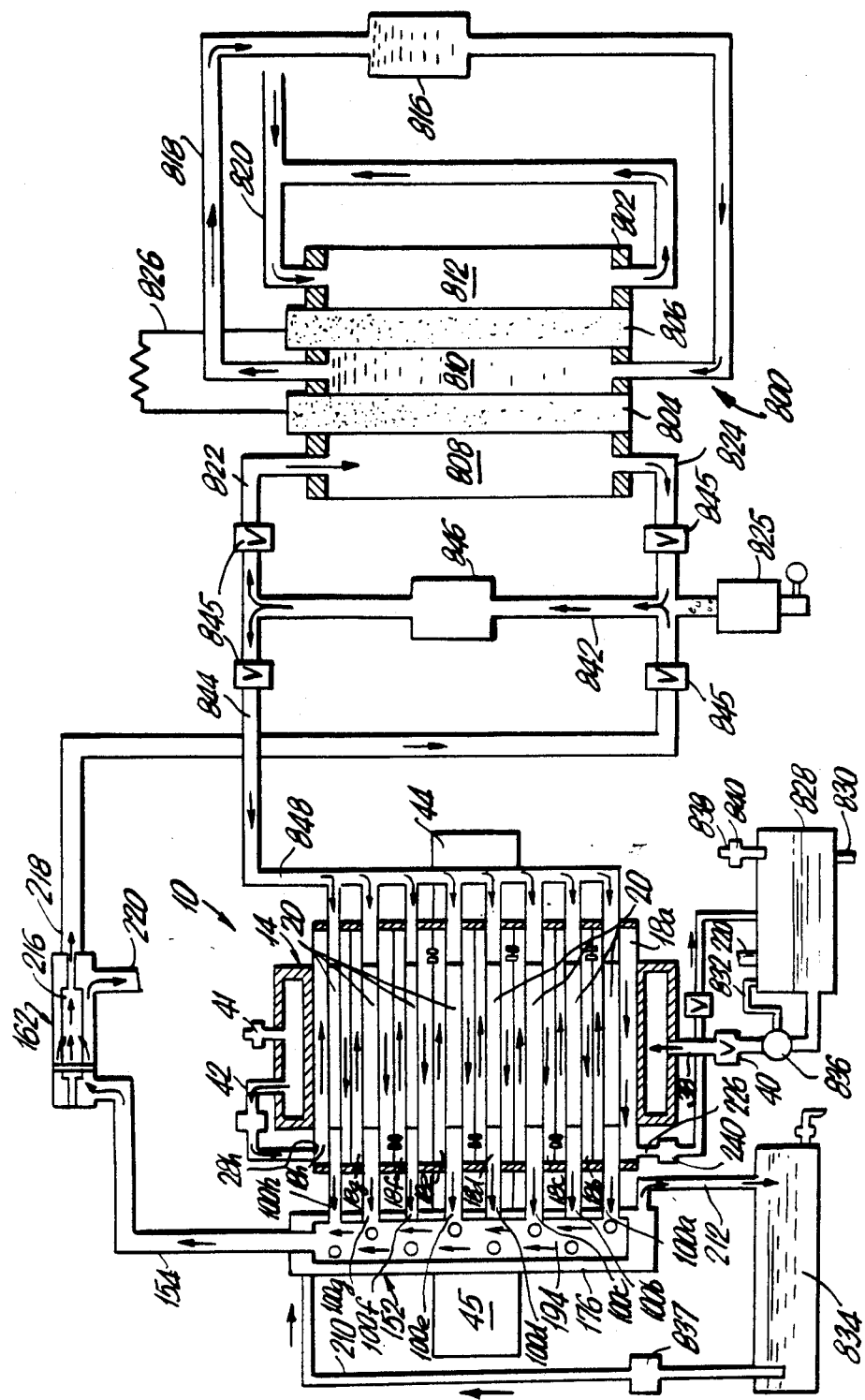
FIG. 27 is a side view, diagrammatically illustrating the system of the invention for producing hydrogen fuel for a fuel cell which generates electricity.

In FIG. 27 there is illustrated the hydrogen generating system 10 which produces hydrogen for a Francis Bacon hydrogen-oxygen type fuel cell 800.

The fuel cell 800 includes a housing 802 and a pair of spaced electrodes 804 and 806, such as porous nickel electrodes. The electrodes 804 and 806 divide the housing 802, into three chambers, 808, 810 and 812. The intermediate chamber 810 contains an electrolyte 814, such as potassium hydroxide, which is conveyed to and from the chamber 810 and a reservoir 816 through conduit 818.

For the electrical generating chemical reaction, air or oxygen is fed to and unreacted air or oxygen is fed from the outer chamber 812 through a conduit 820. Simultaneously hydrogen gas is fed to the outer and opposite chamber 808 through an upper inlet conduit 822, and the unreacted hydrogen gas is conveyed from the chamber 808 by a lower conduit 824. To remove any condensate a collector 825 is provided in the conduit 824. The direct current electricity generated within the cell 800 is conducted between the electrodes 806 and 804 and the illustrative circuit 826.

In this fuel cell system, the hydrogen gas is provided by hydrogen generating system 10 which includes the reactor 12 and the steam generator 14.

Water for the steam generator 14 is provided from a reservoir 828. Make up line 830 is connected to a source of water not shown. Pump return line is 832. Water for the generator 14 is conveyed from the reservoir 828 by a pump 836 through the conduit 38 and control valve 40 into the generator chamber 32.

Heat from burner 44 (or heat from another source) raises the temperature in the reactor 12 to about 1000° F. to 2000° F., whereupon steam is generated in the generator 14 and conveyed to the reactor 12 through the conduit 42, radial bore 28h and into tube 18h. The configuration of the bores within the reactor 12 is similar to that shown in FIG. 17 so that the steam passes about the catalysts 20 in the reactor tubes 18h-a in a serpentine path as previously described.

Within the tubes 18a-h the steam disassociates into hydrogen and oxygen, and hydrogen passes through the catalysts 20 into the conduits 62, interconnecting conduits 100a-h and into the quencher 152. Pump 837 provides cooling water from the reservoir 834 through the conduit 210 to a cooling chamber 176, and water is returned to the reservoir 834 through conduit 212.

At the same time disassociated oxygen, and any residual steam, is conveyed from tube 18a through bore 226 and conduit 238 to the reservoir 828. As shown the disassociated oxygen can be removed from the reservoir by conduit 838 which includes control valve 840 for such purposes.

From the quencher 152 the cooled hydrogen gas is conveyed to the separator 162 by the conduit 154 where only hydrogen is allowed to diffuse through the membrane 216 and into conduit 218. Any residual oxygen and water passes about the membrane 216 into the conduit 220 which is connected at its other end into the reservoir 828.

Downstream, the conduit 218 is connected to conduit 842. In the conduit 842 there is a pump 846 for conveying the hydrogen to both conduits 822 and 844. One way valves 845 in conduits 218, 824, 844 and 822 insure the flow of hydrogen in the direction indicated by the arrows.

The hydrogen conveyed to conduit 822 enters the fuel cell chamber 808 to generate electricity while the hydrogen in the conduit 844 is used with the pump 846 to increase the yield of hydrogen in the reactor 12 as will presently be described.

From the conduit 844 the hydrogen is fed into a manifold 848 connected to the conduits 62 of the catalyst systems 20 in a fluid tight relationship as schematically shown in FIG. 27. The pump 846 influences the quantities of hydrogen gas diffused through the catalysts 20 in the reactor tubes 18a-h by creating a negative pressure in the conduits 62 relative to the positive steam pressure flowing about the catalyst 20 in these same tubes 18a-h. In effect, the pump 846 continually sweeps the diffused generated gases out of the reactor 12. In doing so, the equilibrium on the steam side of the catalysts 20, within the tubes 18a-h, becomes upset and causes further disassociation of the steam into hydrogen and oxygen in trying to maintain equilibrium.

In this embodiment, therefore, the generated hydrogen is used simultaneously to generate electricity in a fuel cell and to increase the yield of the generated hydrogen itself.

In addition to using hydrogen as a fuel, as shown in the illustrative embodiments of FIGS. 21-27, the hydrogen generated by the system 10 of the invention can be used as a chemical in forming products and in chemical processes. For example, the generated hydrogen can be used in the manufacture of ammonia, nitrates, amines and alcohols (e.g., methanol), as well as in the hydrogenation of organic compounds. The generated hydrogen also can be used in steel making and other metal industries, the gasification and liquification of coal, the recovery of shale oil, the production of protein foods, and in total water management programs.

Thus, the invention in its broader aspects is not limited to the specific described embodiments and departures may be made therefrom within the scope of the accompanying claims without departing from the principals of the invention and without sacrificing its chief advantages.

What is claimed:

1. In an energy system, the method of producing hydrogen comprising:
   placing porous material in a reaction zone of a reactor;
   heating said reaction zone;
   heating water;
   feeding the water at elevated temperatures through said reaction zone for interaction with the porous material resulting in the disassociation of hydrogen from the water; and
   diffusing the resulting hydrogen through said porous material to separate the hydrogen from the water and diassociated oxygen.

2. The method according to claim 1 further comprising the step of combusting said hydrogen to aid in said heating.

3. The method according to claim 1 further comprising the steps of:
   conveying the hydrogen to an engine as the fuel for combustion therein;
   combusting the hydrogen in said engine; and
   applying heat from said combustion to said water to increase said heating of said water, the temperature thereof being sufficiently elevated to convert the water to steam.

4. The method according to claim 3 wherein the engine is selected from the group consisting of the piston driven internal combustion engine, the rotary driven internal combustion engine, the gas turbine and the stirling engine.

5. The method according to claim 1 further comprising:
   reacting the generated hydrogen in a fuel cell for the generation of electricity.

6. In an energy system, the method of producing hydrogen comprising the steps of:
   placing porous material in reaction zones in a reactor;
   heating said reaction zones;
   heating water for the generation of steam;
   feeding said steam to the reaction zones for interaction with said porous material resulting in the disassociation of hydrogen from said steam;
   diffusing the resulting hydrogen through said porous material to separate the hydrogen from the steam and disassociated oxygen;
   subsequently passing a portion of said hydrogen through said reaction zones to regenerate said porous material; and
   alternating the flow of said steam and said portion of said hydrogen via transversed and radial passages in the reactor adapted to interconnect the longitudinal reaction zones to each other, thereby permitting the interleaving of said steps of feeding and passing.

7. The method of producing hydrogen according to claim 6 wherein said alternating is responsive to a sensing of the concentration of said hydrogen.

8. The method of generating hydrogen according to claim 6 wherein said porous material in each zone is metallic and contains innumerable sites on its surface, which, with the elevated temperatures in each zone, effect the generation of hydrogen.

9. The method of generating hydrogen according to claim 8, wherein said porous material is formed of a cellular structure of interconnected metal filaments.

10. The method of generating hydrogen according to claim 9 wherein said porous material is selected from the group consisting of iron, copper, silver, nickel, palladium, platinum and iron-nickel.

11. The method of generating hydrogen according to claim 6 wherein the steam in said zones and in the presence of said porous material is elevated to a temperature from 1000° F. to about 2000° F. for the generation of hydrogen.

12. The method of producing hydrogen according to claim 6 further comprising the step of quenching the hydrogen, oxygen and residual steam to reduce the temperatures thereof.

13. The method of producing hydrogen according to claim 6 wherein said zone heating step results in a heating of the zones to a temperature of about 1000° F. to about 2000° F., said method further comprising the step of quenching the hydrogen to reduce the temperature thereof.

14. The method of producing hydrogen comprising the steps of:
    placing porous material in the reaction zones of a reactor;
    heating said reaction zones and said porous material;
    heating water to generate steam therefrom;
    feeding said steam into a first set of selected ones of said reaction zones to permit interacting of said steam at elevated temperatures with said porous material to produce hydrogen until said porous material becomes deactivated by oxidation;
    feeding a reducing agent into a second set of other ones of said reaction zones wherein said porous material has become deactivated to reactivate said porous material;
    transferring heat between said first and second sets of reaction zones to thereby increase the production of hydrogen; and
    alternating the flow of said steam and said reducing agent between sets of reaction zones.

15. The method of producing hydrogen according to claim 14 further comprising the step of diffusing the hydrogen through said porous material to separate the hydrogen from the steam.

16. The method of producing hydrogen ready for use, upon demand, according to claim 15, comprising:
    detecting whether the hydrogen producing zones are producing hydrogen, and
    controlling the flows of steam and reducing agent so that when the porous material in the hydrogen producing reaction zones becomes deactivated, reducing agent is fed thereto to reactivate the porous material, and when the porous material in the deactivated reaction zones becomes reactivated, steam is fed thereto.

17. The method of producing hydrogen according to claim 16 wherein said reducing agent is a portion of the hydrogen produced by said interacting.

18. The method of producing hydrogen from steam according to claim 17, wherein said porous material comprises a web like structure of interconnected filaments of metal.

19. The method of producing hydrogen from steam according to claim 18 wherein the temperature of the steam in the reaction zones and in the presence of the porous material is elevated to the range of approximately 1000° F. to approximately 2000° F.

20. The method of producing hydrogen as recited in claim 14 further comprising the steps of:
    conveying the fluids of reaction from the hydrogen producing zones to a separator, and
    separating hydrogen from said fluids.

* * * * *